(12) United States Patent
Turon

(10) Patent No.: US 10,691,196 B2
(45) Date of Patent: *Jun. 23, 2020

(54) SYSTEM AND METHODS FOR EFFICIENTLY COMMUNICATING BETWEEN LOW-POWER DEVICES

(71) Applicant: Google LLC, Mountain View, CA (US)

(72) Inventor: Martin Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,057

(22) Filed: Jan. 8, 2019

(65) Prior Publication Data

US 2019/0146575 A1    May 16, 2019

Related U.S. Application Data

(63) Continuation of application No. 14/788,447, filed on Jun. 30, 2015, now Pat. No. 10,203,748.

(51) Int. Cl.
*G06F 1/3296* (2019.01)
*H04L 12/28* (2006.01)
*H04L 12/403* (2006.01)

(52) U.S. Cl.
CPC ........ *G06F 1/3296* (2013.01); *H04L 12/2816* (2013.01); *H04L 12/4035* (2013.01); *H04L 2012/2841* (2013.01)

(58) Field of Classification Search
CPC .. G06F 1/3296; H04L 12/2803; H04W 52/00; H04W 52/02; H04W 52/0206; H04W 52/0212; H04W 52/0216; H04W 52/0225; H04W 52/0229; H04W 52/0235; H04W 68/02; H04W 74/02; H04W 74/04; H04W 74/006; H04W 76/048; H04W 74/0816; H04W 84/12; Y02B 60/05
See application file for complete search history.

(56) References Cited

U.S. PATENT DOCUMENTS 10,203,748 B2  2/2019  Turon
2009/0052429 A1  2/2009  Pratt et al.
(Continued)

OTHER PUBLICATIONS

"Final Office Action", U.S. Appl. No. 14/788,447, dated Jun. 1, 2018, 25 pages.
(Continued)

*Primary Examiner* — Marsha D Banks Harold
*Assistant Examiner* — Dharmesh J Patel
(74) *Attorney, Agent, or Firm* — Colby Nipper PLLC

(57) ABSTRACT

A system includes a first electronic device that activates a first receiver according to a communication schedule that includes a plurality of frames. Each frame is organized according to a grid including a plurality of cells, wherein the cells are associated with a plurality of communication channels and a plurality of time slots. The system also includes a second electronic device that communicates with the first electronic device by transmitting a wake-up packet during a first time slot on a first communication channel. The first time slot and the first communication channel are located at a known position of a respective grid in each frame of the communication schedule. The first electronic device performs an operation based on the wake-up packet after receiving the wake-up packet. The second electronic device also receives a first acknowledgment packet associated with the wake-up packet.

20 Claims, 16 Drawing Sheets

(56) References Cited

U.S. PATENT DOCUMENTS

2009/0175214 A1 7/2009 Sfar et al.
2011/0007657 A1 1/2011 Kazmi et al.
2013/0132745 A1 5/2013 Schoening et al.
2017/0003736 A1 1/2017 Turon

OTHER PUBLICATIONS

"Non-Final Office Action", U.S. Appl. No. 14/788,447, dated Sep. 11, 2017, 19 pages.
"Notice of Allowance", U.S. Appl. No. 14/788,447, dated Sep. 26, 2018, 7 pages.

SYSTEM AND METHODS FOR EFFICIENTLY COMMUNICATING BETWEEN LOW-POWER DEVICES

RELATED APPLICATION

This application claims priority and is a continuation of U.S. Utility patent application Ser. No. 14/788,447, filed on Jun. 30, 2015, which is incorporated herein by reference in its entirety.

BACKGROUND

The present disclosure relates generally to communication schemes between devices in a communication network. More specifically, the present disclosure relates generally to enabling devices to communicate with each other while using power efficiently.

Numerous electronic devices are now capable of connecting to wireless networks. In some instances, the electronic devices communicate between each other using a mesh network. As such, one electronic device may send data to another electronic device by relaying the data via intermediate electronic devices. Although relaying data between electronic devices is a useful way to communicate between devices, power may not be used efficiently by the electronic devices when transmitting and receiving data between each other.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a first electronic device that activates a first receiver according to a communication schedule that includes a plurality of frames. Each frame is organized according to a grid including a plurality of cells, wherein the cells are associated with a plurality of communication channels and a plurality of time slots. The system also includes a second electronic device that communicates with the first electronic device by transmitting a wake-up packet during a first time slot on a first communication channel. The first time slot and the first communication channel are located at the known position of a respective grid in each frame of the communication schedule. The first electronic device performs an operation based on the wake-up packet after receiving the wake-up packet. The second electronic device also receives a first acknowledgment packet associated with the wake-up packet.

In another embodiment, an electronic device that communicates with a plurality of electronic devices disposed in a building includes a processor that receives an indication of data to be transmitted to one of the plurality of electronic devices and identifies a first cell in first frame of a grid of a communication schedule including a plurality of frames of the grid. The first cell is associated with a first time slot and a first communication channel in which the electronic device and the one of the plurality of electronic devices are scheduled to communicate with each other. The processor also transmits a plurality of wake-up packets centered at a time within the first time slot to the one of plurality of electronic devices, such that each of the plurality of wake-up packets is configured to cause the one of the plurality of electronic devices to perform an operation based on a respective wake-up packet.

In yet another embodiment, a method may include receiving, via a processor, a communication schedule comprising a plurality of frames of a grid, such that the grid is organized with respect to a plurality of time slots and a plurality of communication channels. Each frame includes a first cell associated with one of the plurality of time slots, one of the plurality of communication channels, and two devices configured to communicate with each other. The method may also include activating, via the processor, a receiver according to a double sniff interval, wherein the receiver is configured to receive data packets from one of the two devices, and wherein the receiver is activated during the one of the plurality of time slots and on the one of the plurality of communication channels. The method may also include detecting, via the processor, energy of a wake-up packet when the receiver is activated and activating, via the processor, the receiver for a duration of time when the energy is detected. The duration of time corresponds to an amount of time to receive the wake-up packet. The wake-up packet comprises instructions to perform an operation configured to adjust a condition in a building.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
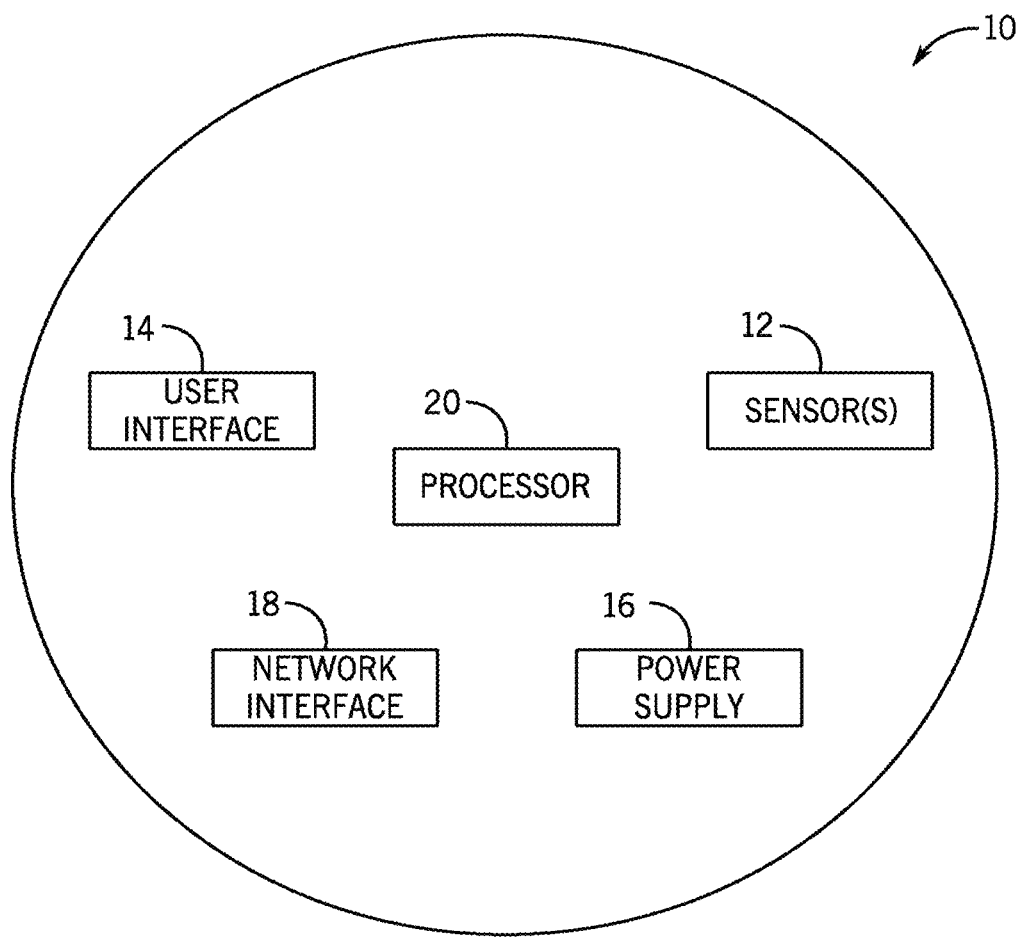
FIG. 1 illustrates a block diagram of a general device that may control and/or monitor a building environment, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments disclosed herein are related to enabling electronic devices to communicate between each other while using power efficiently. More specifically, some of the embodiments disclosed herein are related to using a fixed time slot in a communication schedule to denote a time period during which a pair of electronic devices may communicate with each other. In addition to a particular time period, the communication schedule may provide a communication channel on which the pair of electronic devices may communicate with each other. In other words, the communication schedule may denote which channel(s) a pair of electronic devices in a communication network may use to communicate directly with each other and corresponding time slot(s) in which the communication may take place.

In one embodiment, the communication schedule may be organized according to a number of time slots and a number of communication channels. That is, each grid may include a number of cells, such that each cell is associated with one time slot and one communication channel. Each grid of the communication schedule may include the same number of time slots that span the same duration of time; however, the time slots and channels in which various pairs of electronic devices are designated to communicate with each other may change in each grid to ensure that each pair of electronic devices may have an opportunity to communicate with each other using different communication channels. By changing the communication channels used to communicate data with each other, the pair of electronic devices may not be limited to communicating on a weak communication channel relative to other available communication channels.

In certain embodiments, the communication schedule may designate at least one fixed cell in each grid of the communication schedule as a wake-up time slot for each pair of electronic devices that are capable of communicating with each other. As such, the fixed cell may indicate a time slot in which one electronic device may receive data from another electronic device and a particular communication channel in which the communication may take place. Accordingly, during the wake-up time slot, a receiving electronic device may activate its communication system (e.g., receiver), such that it may receive any wake-up packets being transmitted to it on a particular communication channel. In the same manner, during the same wake-up time slot, a transmitting electronic device may transmit a wake-up packet to the receiving electronic device on the specified communication channel. After receiving the wake-up packet, the receiving electronic device may activate its communication system to receive data from the transmitting electronic device according to the communication schedule. That is, certain cells in each grid of the communication schedule may be associated with the receiving electronic device and the transmitting electronic device pair. As such, the receiving electronic device and the transmitting electronic device pair may communicate with each other at different time slots and on different communication channels, thereby minimizing the probability of communicating on a weak communication channel.

By transmitting wake-up packets at a fixed time slot on a particular communication channel, the transmitting electronic device may communicate data to the receiving electronic device without continuously blasting wake-up packets on one or more communication channels until the receiving electronic device activates its communication system. As a result, the transmitting electronic device may regularly send data to the receiving electronic device in a power efficient manner. Moreover, the wake slot also allows for fewer re-sync packets to be sent. For example, if a re-sync packet is typically sent every 30 seconds to maintain the time slot, by using the wake slot, re-sync packets are efficiently sent at each wake slot, which may be after minutes pass, as opposed to seconds.

Smart Device in Smart Home Environment

By way of introduction, FIG. 1 illustrates an example of a general device 10 that may that may be disposed within a building environment. In one embodiment, the device 10 may include one or more sensors 12, a user-interface component 14, a power supply 16 (e.g., including a power connection and/or battery), a network interface 18, a processor 20, and the like.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface components 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices, servers, routers, and the like. As such, the network interface 18 may enable the device 10 to communicate with other devices 10 or communication-capable components via a wired or wireless network. The network interface 18 may include a wireless card or some other transceiver connection to facilitate this communication. In any case, the network interface 18 may be capable of communicating with a cloud-computing system that may receive data from a variety of different types of devices 10, each of which may communicate using a different communication protocol. The network interface 18 may include a receiving component and a transmitting component capable of receiving data and transmitting data respectively. In certain embodiments, the network interface 18 may activate the receiving component and/or the transmitting component based on instructions from the processor 20. The data being received or transmitted by the network interface 18 may correspond to any number of formats such that it may be communicated via a wired or wireless manner. As will be appreciated, the network interface 18 may enable devices to communicate with each other based on a communication schedule, as will be discussed in greater detail below. Before continuing, it should be noted that there may be more than one network interface 18 within the device 10. As such, the device 10 may employ a number of these network interfaces 18 to communicate with other devices.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. In certain embodiments, the processor 20 may execute operations such as operating the user-interface component 14 and the like, as well as detecting a hazard or temperature from the sensor 12.

In some instances, devices may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

Figure 2:
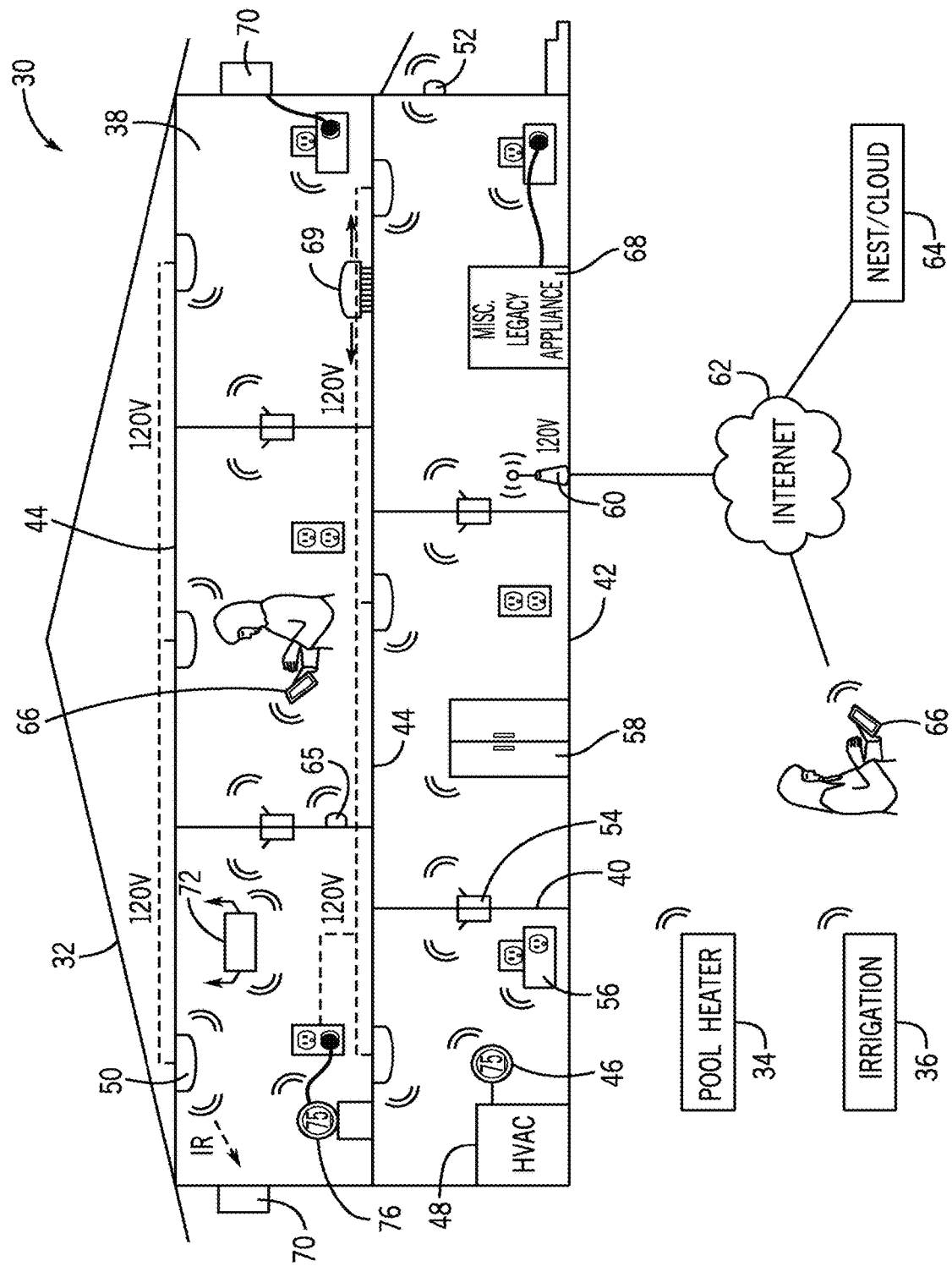
FIG. 2 illustrates a block diagram of a smart-home environment in which the general device of FIG. 1 may communicate with other devices via a network layer protocol, in accordance with an embodiment.

Keeping the foregoing in mind, FIG. 2 illustrates an example of a smart-home environment 30 within which one or more of the devices 10 of FIG. 1, methods, systems, services, and/or computer program products described further herein can be applicable. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment can control and/or be coupled to devices outside of the actual structure 32 including multiple small structures (e.g., detached garage). Indeed, several devices in the smart home environment need not physically be within the structure 32 at all. For example, a device controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42, ceiling 44, window, door, furniture (e.g., desk), and the like.

In some embodiments, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensors 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-home environment 30.

In some embodiments, the smart-home environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further includes a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and new houses. For example, the devices 10 may be designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices outside of the physical home but within a proximate geographical range of the home. For example, the smart-home environment 30 may include a pool heater monitor 34 that communicates a current pool temperature to other devices within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dew point, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current set point temperature for a device and adjust it using a computer. The user can be in the structure during this remote communication or outside the structure.

As discussed, users can control the smart thermostat and other smart devices in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment "learns" who is an occupant and permits the devices 66 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the homeowner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface, which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the homeowner is asked if they want to enable a Local Web App (LWA) on the smart device. Business owners will likely say no; homeowners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 66. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, Home-Plug, etc.).

According to embodiments, all or some of the smart devices can serve as wireless or wired repeaters. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system 64. The central server or cloud-computing system 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals). In certain embodiments, the cloud-computing system 64 may receive data from each of the devices within the smart-home environment 30, such that the data regarding the smart-home environment 60 may be stored remotely, analyzed, shared with certain service providers, and the like.

According to embodiments, the smart devices combine to create a mesh network of spokesman and low-power nodes in the smart-home environment 30, where some of the smart devices are "spokesman" nodes and others are "low-powered" nodes. Some of the smart devices in the smart-home environment 30 are battery powered, while others have a regular and reliable power source, such as by connecting to wiring (e.g., to 120V line voltage wires) behind the walls 40 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 30 as well as with the central server or cloud-computing system 64. On the other hand, the devices that are battery powered are referred to as "low-power" nodes. These nodes tend to be smaller than spokesman nodes and can only communicate using wireless protocols that require very little power, such as Zigbee, 6LoWPAN, etc. Further, some, but not all, low-power nodes are incapable of bidirectional communication. These low-power nodes send messages, but they are unable to "listen". Thus, other devices in the smart-home environment 30, such as the spokesman nodes, cannot send information to these low-power nodes.

As described, the smart devices serve as low power and spokesman nodes to create a mesh network in the smart-home environment 30. Individual low-power nodes in the smart-home environment regularly send out messages regarding what they are sensing, and the other low-powered nodes in the smart-home environment—in addition to sending out their own messages—forward the messages, thereby causing the messages to travel from node to node (i.e., device to device) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-home environment 30 as well as over the Internet 62 to the central server or cloud-computing system 64. According to embodiments, the mesh network enables the central server or cloud-computing system 64 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment, as well as to other spokesman nodes that did not receive the commands directly from the central server or cloud-computing system 64.

An example of a low-power node is a smart night-light 65. In addition to housing a light source, the smart night light 65 houses an occupancy sensor, such as an ultrasonic or passive IR sensor, and an ambient light sensor, such as a photoresistor or a single-pixel sensor that measures light in the room. In some embodiments, the smart night-light 65 is configured to activate the light source when its ambient light sensor detects that the room is dark and when its occupancy sensor detects that someone is in the room. In other embodiments, the smart night-light 65 is simply configured to activate the light source when its ambient light sensor detects that the room is dark. Further, according to embodiments, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the devices 10 may be incapable of communicating with each other. Therefore, as discussed in detail below, the present techniques provide network communication jamming attack detection and notification solutions to such a problem.

In some embodiments, the mesh network can be used to automatically turn on and off lights as a person transitions from room to room. For example, the low-powered and spokesman nodes detect the person's movement through the smart-home environment and communicate corresponding messages through the mesh network. Using the messages that indicate which rooms are occupied, the central server or cloud-computing system 64 or some other device activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart night-light 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system 64 or some other device uses occupancy information obtained from the low-powered and spokesman nodes to determine which rooms are occupied and then turns on lights (e.g., nightlights 65, wall switches 54, wall plugs 56 that power lamps, etc.) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 2. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" set point temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 30 that happens to be closest to the occupant when the occupant falls asleep will be the device that transmits messages regarding when the occupant stopped moving, from which the central server or cloud-computing system 64 will make inferences about where and when the occupant prefers to sleep. This closest smart device will be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment to identify such patterns.

Figure 3:
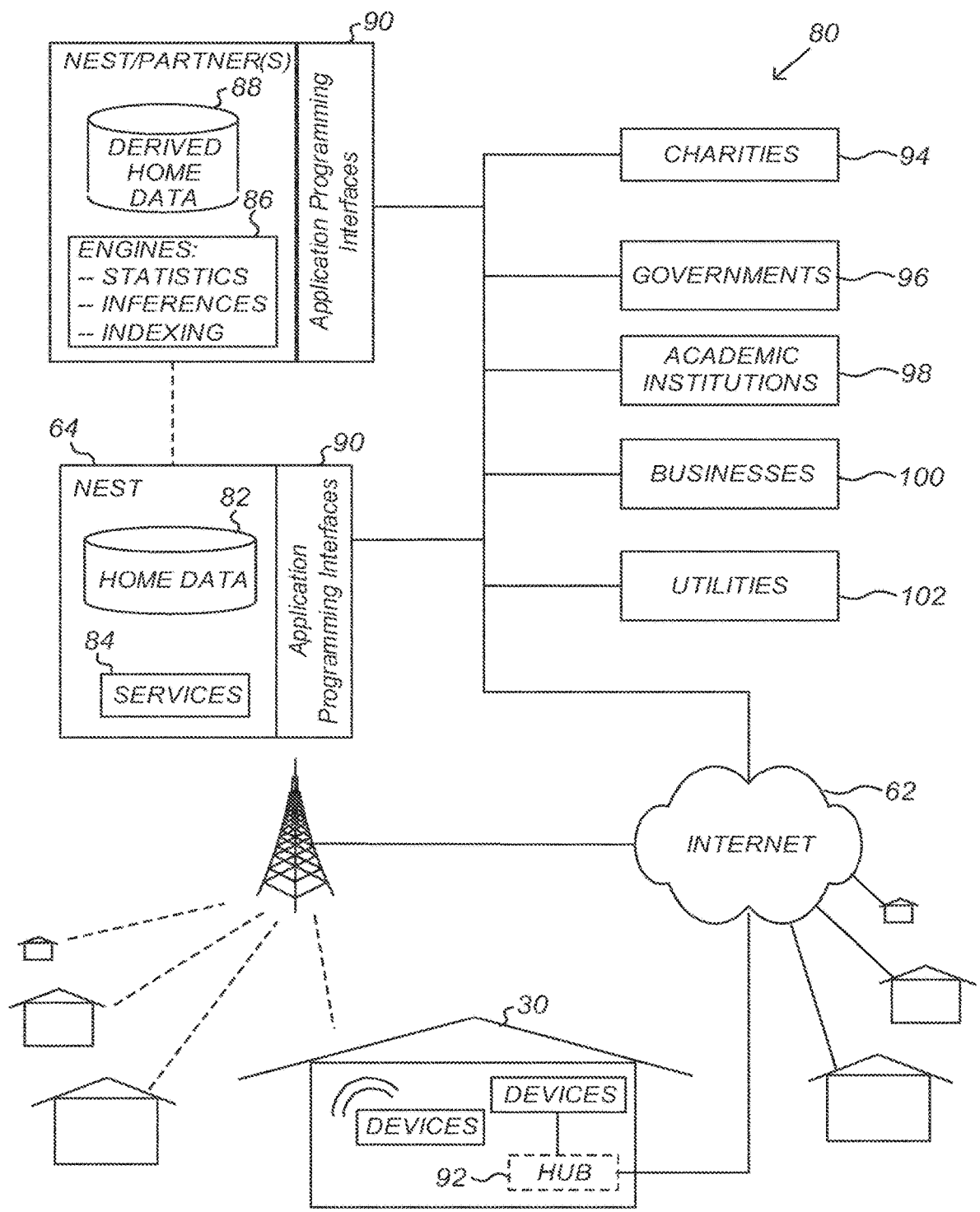
FIG. 3 illustrates a network-level view of an extensible devices and services platform with which the smart-home environment of FIG. 2 can be integrated, in accordance with an embodiment.

In addition, FIG. 3 illustrates an embodiment of an extensible devices and services platform 80 that can be concentrated at a single server or distributed among several different computing (e.g., cloud-computing system 64) entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing system 64 makes inferences about water usage in the home and provides related services. For example, the central server or cloud-computing system 64 can run programs/algorithms that recognize what water sounds like and when it is running in the home. According to one embodiment, to map the various water sources of the home, upon detecting running water, the central server or cloud-computing system 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing system 64 will know that the water usage at that time is associated with that toilet. Thus, the central server or cloud-computing system 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing system 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing system 64 can determine the "signatures" of particular types of pests.

For example, in the event the central server or cloud-computing system 64 detects sounds that may be associated with pests, it notifies the occupants of such sounds and suggests hiring a pest control company. If it is confirmed that pests are indeed present, the occupants input to the central server or cloud-computing system 64 confirms that its detection was correct, along with details regarding the identified pests, such as name, type, description, location, quantity, etc. This enables the central server or cloud-computing system 64 to "tune" itself for better detection and create "signatures" or "fingerprints" for specific types of pests. For example, the central server or cloud-computing system 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing system 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
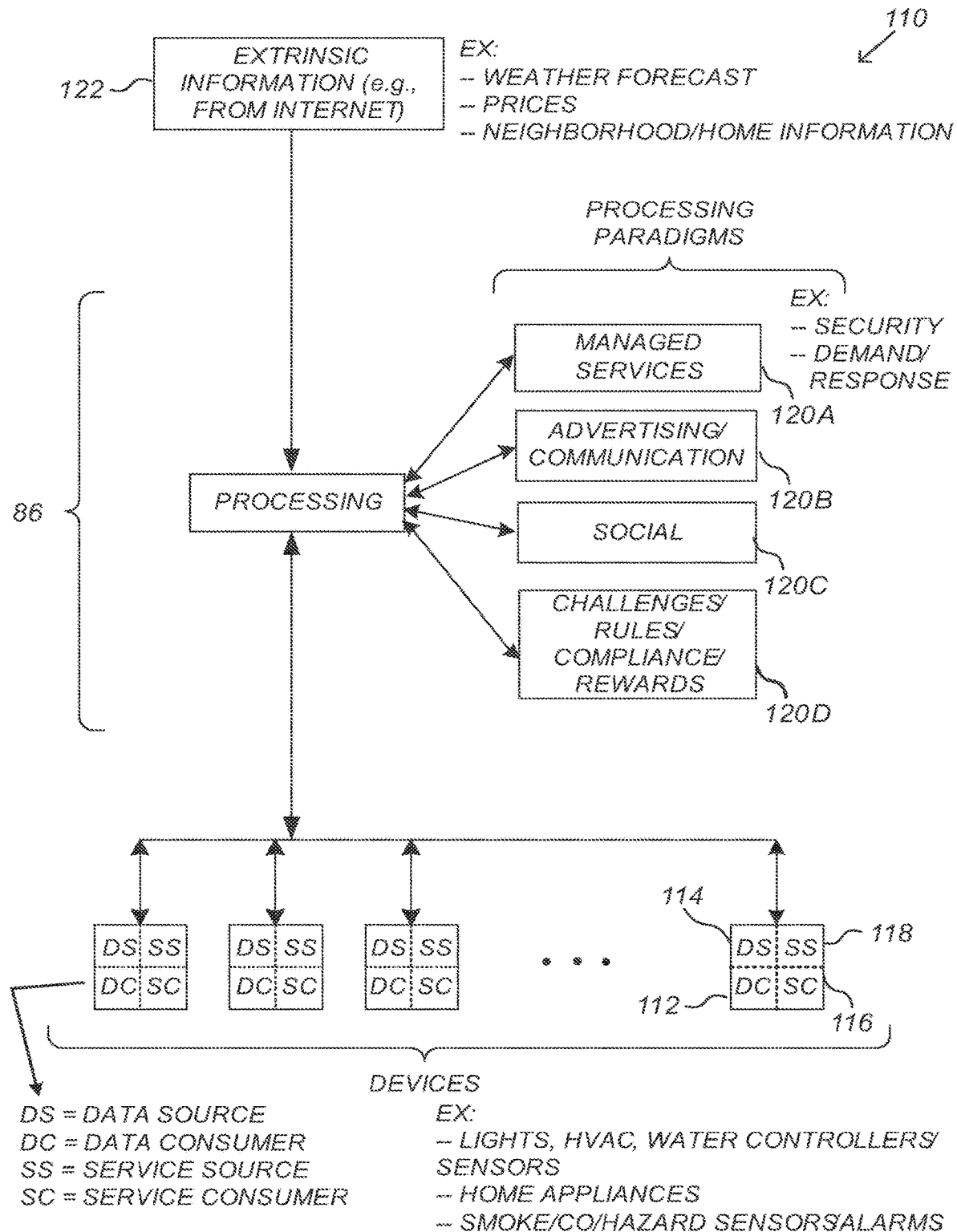
FIG. 4 illustrates an abstracted functional view of the extensible devices and services platform of FIG. 3, with reference to a processing engine as well as devices of the smart-home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

As previously discussed, the described extensible devices and services platform 80 may enable communicating emergency information between smart-home environments 30 that are linked and/or to the proper authorities. For example, when a burglar breaks into a smart-home environment 30, a home security system may trip and sound an alarm and/or send emergency notifications to the neighbors, the police, the security company, and the like.

Power Efficient Communication Between Devices

Figure 5:
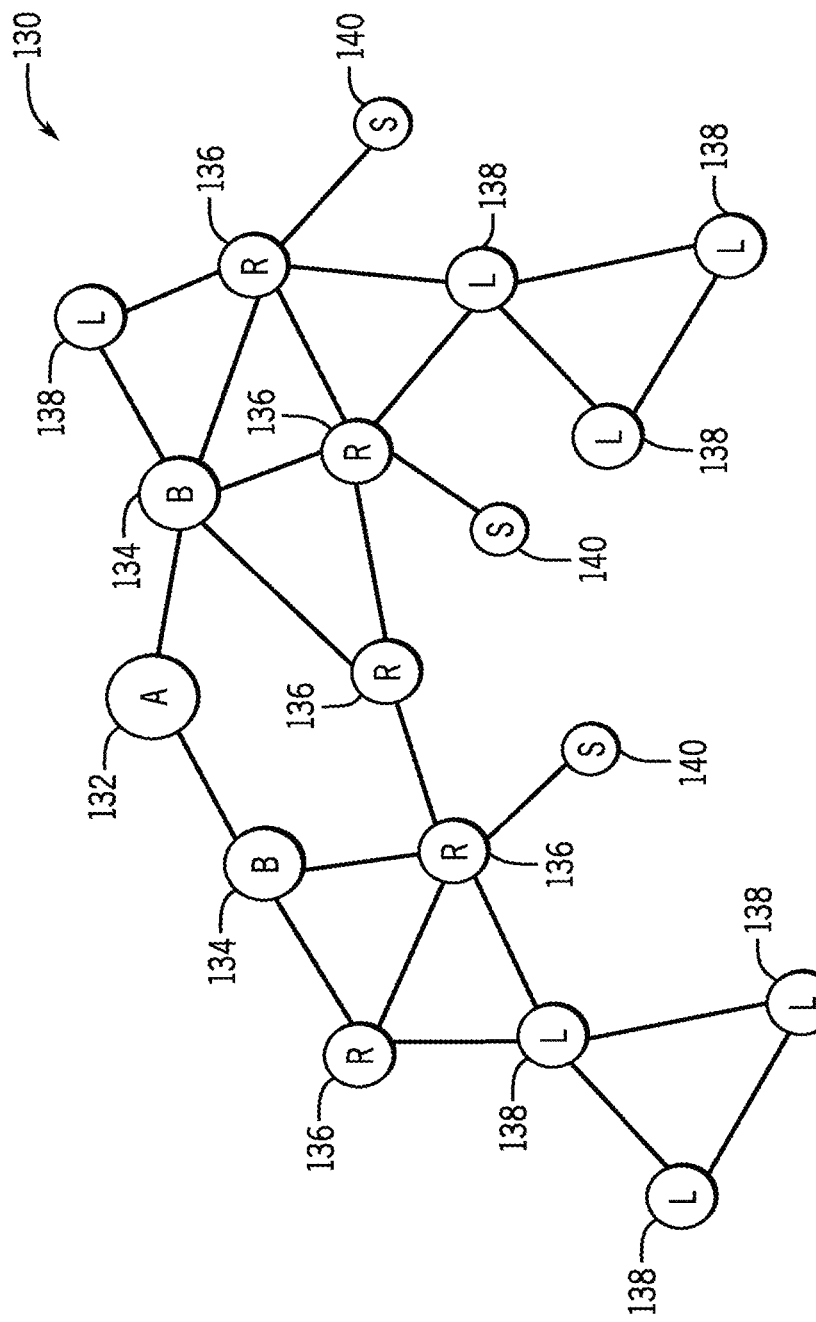
FIG. 5 illustrates a block diagram of an example network of electronic devices capable of communicating with each other, in accordance with an embodiment.

As discussed above, the device 10 may include low-power nodes that may be battery powered and may communicate using power more efficiently, as compared to the nodes that have a continuous source of power. In certain embodiments, a number of low-power nodes may communicate with each other via a mesh network. For example, FIG. 5 illustrates an example communication network 130 that may be employed in the smart-home environment 30.

The communication network 130 may include an access point 132, border routers 134, high-power routers 136, low-power routers 138, sleepy end nodes 140, and the like. The access point 132 may include a device that may have access to another network such as the Internet. Access point 132 may be accessible via a Wi-Fi or the like. Border routers 134 may include devices that communicate using Wi-Fi as well as using low-rate wireless personal area networks (LR-WPANs) (e.g., IEEE 802.15.4-capable devices). As such, the border routers 134 may communicate with the access point 132 and other low-power devices such as the high-power routers 136, the low-power routers 138, the sleepy end nodes 140, and the like.

The high-power routers 136 may communicate using the LR-WPANs and may continuously operate as a receiver. That is, the high-power routers 136 may keep its receiver active or on such that the high-power routers 136 may receive any data sent to them at any time. To enable the high-power routers 136 to continuously operate in a receive mode, the high-power routers 136 may be coupled to a continuous source of power such as a 120-volt alternating current (AC) power source provided within the smart-home environment. The low-power router 138, on the other hand, may operate using a battery and thus may transmit and receive data in a power efficient manner. The low-power routers 138 may thus also communicate using the LR-WPANs; however, the low-power routers 138 may be a duty-cycled router that wakes at certain intervals of time to send and receive data. Sleepy end nodes 140 may also communicate using the LR-WPANs but may just wake at specific instances to send data but may not be capable of receiving data by their own accord. That is, the sleepy end nodes 140 may receive data when their parent router caches data until the next time the sleepy end node checks in.

Figure 6:
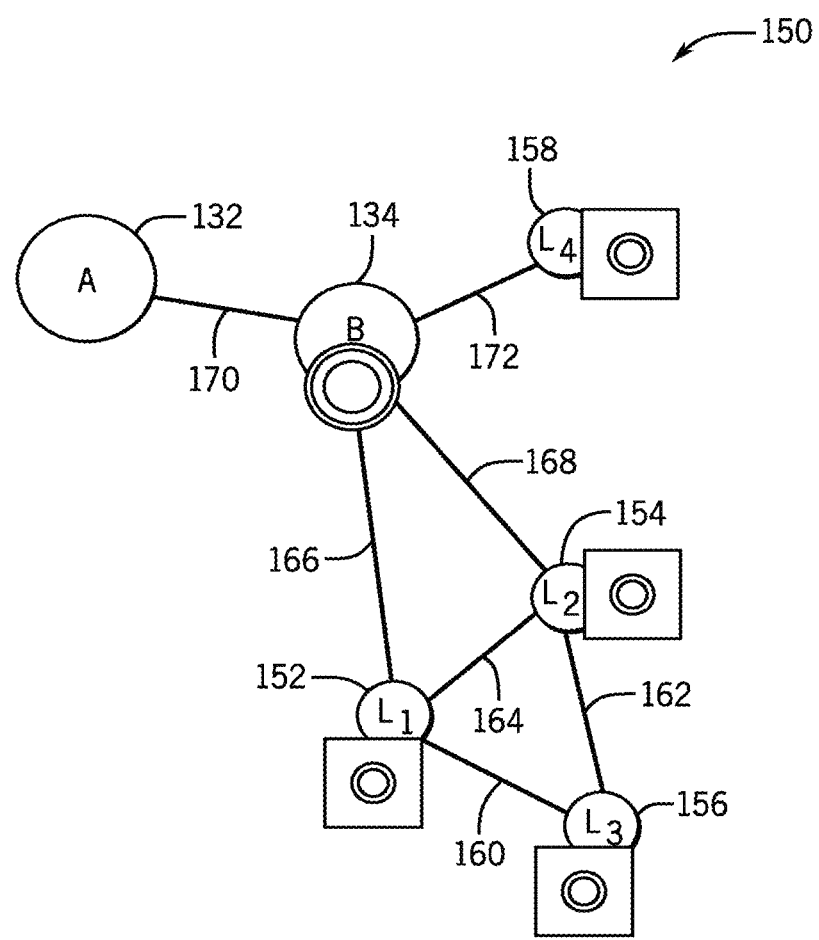
FIG. 6 illustrates a block diagram of an example network of electronic devices capable of communicating with each other in the smart-home environment of FIG. 2, in accordance with an embodiment.

With the foregoing in mind, FIG. 6 illustrates an example communication network 150 that attributes an access point 132, a border router 134, and a number of low-power routers 138 (e.g., 152, 154, 156, and 158 of FIG. 6) with example devices that may be part of the smart-home environment 30. In one embodiment, the border router 134 may correspond to the smart thermostat 46 and the low-power routers 138 may correspond to the smart hazard detector 50 described above.

As shown in FIG. 6, the devices of the communication network 150 may communicate with each other via bi-lateral communication links 160-172 between various pairs of devices. For example, low-power router 156 may communicate with low-power router 152 via communication link 160. Each communication link 160-172 may correspond to a communication channel (e.g., frequency band at a particular time interval) in which the corresponding pair of devices may transmit and receive data between each other. Although FIG. 6 illustrates a particular arrangement of devices and communication link between the devices, it should be noted that that the communication network 150 of FIG. 6 is provided as an example, and thus is not meant to limit the manner in which the devices may be connected.

In the example communication network 150, the low-power router 156 may transmit data to the access point 132 via multiple hops across the communication network 150. For example, the low-power router 156 may transmit data to the access point 132 via communication links 160, 166, and 170. In addition to the low-power router 156, it should be noted that in-structure mobile devices may also be accessible via the access point 132 as well.

Figure 7:
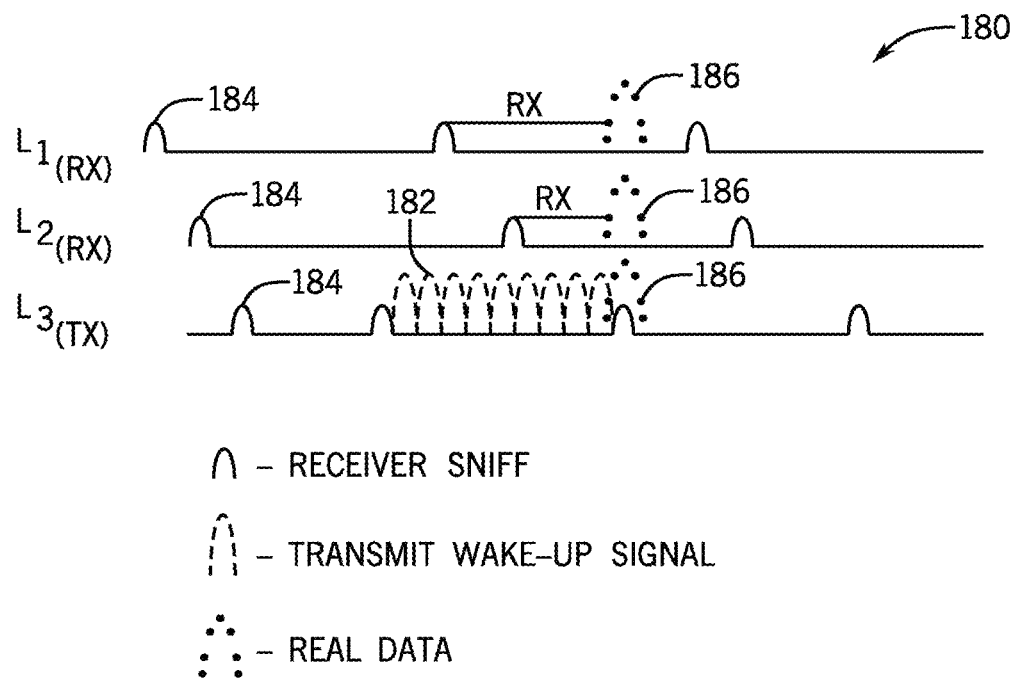
FIG. 7 illustrates an example timing diagram that corresponds to how data may be transmitted between the example electronic devices of FIG. 6, in accordance with an embodiment.

In certain embodiments, to wake a neighboring device, a transmitting device may continuously blast transmit a wake-up signal across one or more communication channels for some amount of time to ensure that the neighboring device receives the wake-up signal. For example, FIG. 7 illustrates a timing diagram 180 that depicts how the low-power router 156 may blast a wake-up packet or continuously transmit a wake-up packet 182 for some duration of time. Generally, the duration of time may correspond to a sufficient amount of time in which neighboring devices may activate their receivers. In one embodiment, devices operating in a low power listening (LPL) mode may activate its receiver for a brief amount of time during a receiver sniff 184 to determine whether another device is attempting to transmit data to the respective devices. Each device operating in the LPL mode may perform the receiver sniff 184 at regular intervals (e.g., 4 s). However, each device may perform its respective sniff at different times on various communication channels or on a set wake-up channel, but other devices may not be aware of the exact times and/or channels at which each respective sniff may occur. As such, the transmitting device may continuously transmit the wake-up signal across multiple communication channels for a certain amount of time that corresponds to a known time interval between the receiver sniffs 184.

As shown in FIG. 7, after the receiving device detects the wake-up signal during the receiver sniff 184, the receiving device may keep its receiver active to receive a real data packet 186 at the end of the wake-up signal blast. Although operating in the LPL mode as depicted in FIG. 7 may provide for an effective way to transmit data to neighboring devices, transmitting wake-up signals in a blast fashion may consume a significant amount of power. This consumption of power may not be desired for low-power router devices that operate using a battery. That is, transmitting wake-up signals in a blast fashion as described above may enable the low-power router device to transmit wake-up signals associated with relatively rare events, such as fire hazard alarms, while still consuming a relatively small amount of power. However, if the transmitting device intends to send other types of data (e.g., sensor data, temperature data, occupancy data, commands) in a more regular interval, the battery of the low-power router device may limit the number of data transmissions that the transmitting device may perform.

Figure 8:
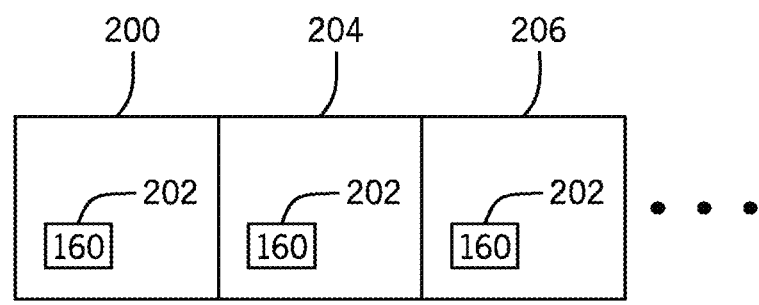
FIG. 8 illustrates a grid of communication channels and corresponding time slots that indicate how data may be transmitted between the example electronic devices of FIG. 6, in accordance with an embodiment.

To use battery power efficiently, devices capable of communicating with each other in the smart home environment 30 may operate in some kind of low-power mode. Operating in the low-power mode may involve deactivating or placing certain power-consuming components (e.g., processor, radios, sensors, bus peripherals, power domains, clock domains) within the device in a sleep state for a certain period of time and periodically awaking certain components to detect whether the device should perform certain operations. With this in mind, in certain embodiments, to achieve additional power efficiencies while operating in a low-power mode, each device in the smart home environment 30 may communicate with each according to a communication schedule that works according to a common time source across the smart home environment 30. In one embodiment, the communication schedule may specify a time interval and a corresponding communication channel (e.g., frequency) in which a pair of devices may communicate with each other. For example, FIG. 8 illustrates an example communication schedule 200 for the communication network 150. The communication schedule 200 may include a grid of cells organized according to time slots and communication channels. As shown in the communication schedule 200 of FIG. 8, each communication link 160-172 may be associated with one or more cells and thus one or more time slot and channel pairs. Each cell that is designated to one of the communication links 160-172 may facilitate communication between a respective of the devices in the communication network 150 associated with the corresponding communication links. For example, according to the communication schedule 200, the communication link 164 is active at t=100 ms on channel 14. In this manner, the low-power router 154 may communicate with low-power router 152 at t=100 ms on channel 14.

With this in mind, it should be noted that the communication schedule 200 depicted in FIG. 8 may represent a single frame of the communication schedule 200. As such, in one embodiment, the frame including the grid depicted in the communication schedule 200 may continuously repeat to continuously facilitate communication between devices in the communication network 150. However, due to various properties (e.g., electric fields, communication devices, physical barriers) of any particular smart home environment 30, each communication channel of the communication schedule 200 may not provide a sufficiently similar quality of communication. That is, while one communication channel may provide a certain amount of bandwidth for data transmission, another communication channel may provide a lower amount of bandwidth due to various types of noise.

Accordingly, in certain embodiments, instead of continuously repeating the grid depicted in the communication schedule 200, the communication schedule 200 may include a number of frames, such that each frame may have a different grid that defines different time slots and channel pairs in which each communication link may be active. In this manner, the communication schedule may enable devices to communicate with each other in a time-synchronization channel hopping (TSCH) scheme. By using a TSCH scheme, the communication schedule may randomly or pseudo-randomly assign time slots and communication channel pairs (i.e., cell) for each communication link 160-182 during each successive frame of the communication schedule 200. As such, the communication network 150 may provide a more robust communication network in which the devices of the network may communicate with each other. For example, if a pair of devices is scheduled to communicate with each other on a relatively weak communication channel in one frame, the same pair of devices may be scheduled to communicate with each other on a different communication channel, which may be a better communication channel, in the next frame.

In certain embodiments, each device of the communication network 150 may have access to the communication schedule 200. As such, when one device desires to communicate with another device, the transmitting device may send a wake-up packet on a particular channel at a designated time slot based on the communication schedule 200. However, although using the TSCH scheme may provide improved data transmission quality between devices, the success of communication between each device using the TSCH scheme is largely dependent on each device being in sync with each other with respect to time. That is, if a clock in one device drifts and becomes out of sync with the clock of another device, the transmission of data between each other may be jeopardized if the transmitting device sends a wake-up packet at a designated time slot but is not received by the receiving device due to the drift in synchronization. Generally, devices may use crystal oscillators or the like to operate a clock. The ability of a clock to maintain a precise time and not to drift may depend on the quality of the respective crystal oscillator.

Figure 9:
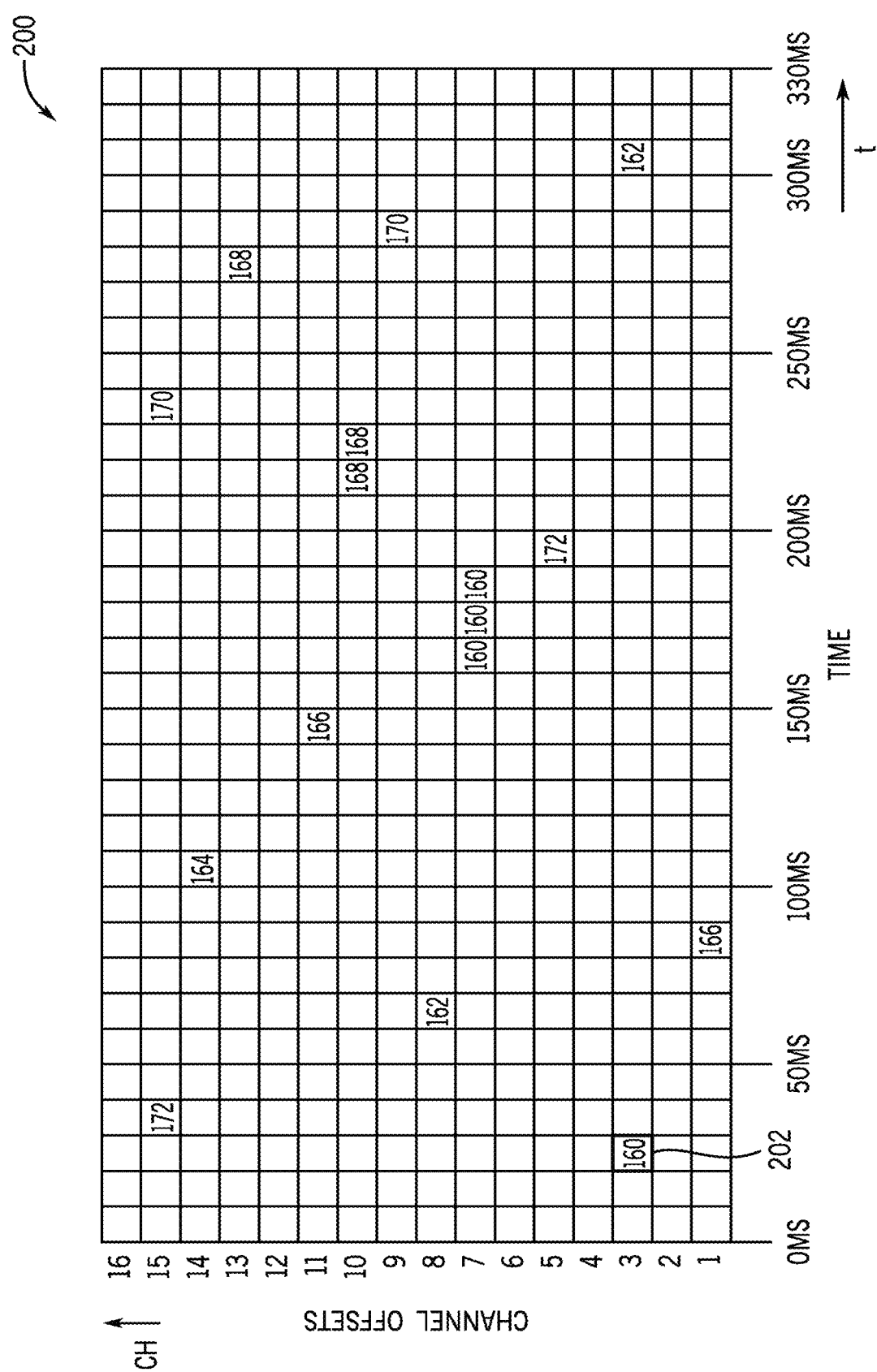
FIG. 9 illustrates multiple example grids of time slots of FIG. 8, such that each grid includes a wake-up time slot, in accordance with an embodiment.

Keeping the foregoing in mind, in one embodiment, the communication schedule 200 may include one fixed cell (time slot and channel pair) in the grid that may serve as a wake-up slot 202 for each frame of the communication schedule 200. In other words, although the communication schedule 200 may operate according to a TSCH scheme, at least one of the time slot-channel windows may continuously repeat in the same time slot on the same channel for each frame (e.g., frame 200, frame 204, frame 206), as illustrated in FIG. 9. In certain embodiments, a wake-up slot may be defined for each pair of devices that communicate directly with each other. The known wake-up slot may be predetermined and communicated to each other when joining the communication network 150. Alternatively, two devices may collectively determine a wake-up slot for each device to transmit wake-up packets. Additionally, a common wake-up slot may be defined such that a set of devices will listen at regularly, and any of the devices sharing that wake slot can transmit the wake-up packet and wake one or more nodes in the set. In any case, during the wake-up slot 202, the receiving device may sniff or activate its receiver to determine whether a wake-up packet is being sent from a transmitting device. If a wake-up packet is received, the receiving device may prepare to receive data during one or more time slots in which the pair of communicating devices may be scheduled to communicate with each other as per the communication schedule 200. Alternatively, after the wake-up packet is received, the receiving device may allow for an out-of-band communication outside the regular communication schedule. That is, upon receipt of a wake-up packet, the receiving device may remain active and continue receiving for one or more time slots immediately after receiving the wake-up packet.

By employing a fixed cell (e.g., time slot and communication channel pair) of the communication schedule 200 to communicate a wake-up packet, the transmitting device no longer continuously blasts wake-up packets for an extended period of time on one or more communication channels. Instead, the transmitting device may transmit a wake-up packet during the wake-up time slot 202 on a particular communication channel when it desires to transmit data to the receiving device. As a result, the transmitting device may significantly reduce the amount of transmissions that it may perform to transfer data to the receiving device.

It should be noted that although the communication schedule 200 is described as using a fixed cell for its wake-up time slot 202, in certain embodiments, the wake-up time slot 202 may also be implemented in non-fixed cells (e.g., random cells). Regardless of how the wake-up time slot 202 is scheduled, so long as each device is aware of the appropriate time and channel in which the wake-up time slot 202 should occur, the following techniques may be used to ensure that data is successfully transmitted throughout the communication network 150 or the like.

Figure 10:
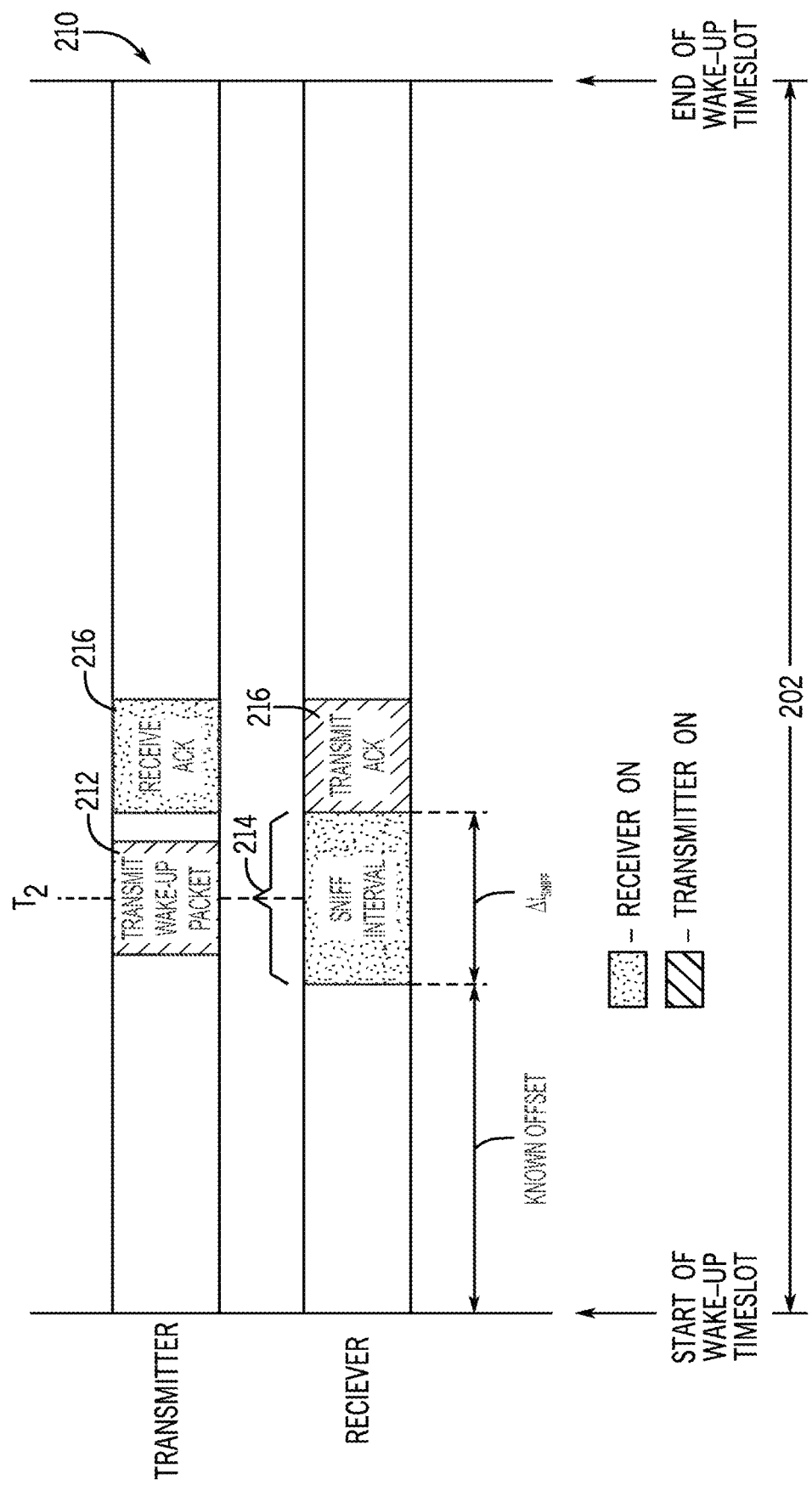
FIG. 10 illustrates an example timing diagram indicating how an electronic device may be awaken by another electronic device during the wake-up time slot FIG. 9 using a single wake-up packet, in accordance with an embodiment.

With the foregoing in mind, FIG. 10 illustrates an example timing diagram 210 associated with the transmission of a wake-up packet and the reception of the wake-up packet during wake-up time slot 202 by the transmitting device (e.g., low-power router 156) and the receiving device (e.g., low-power router 152), respectively, during the wake-up slot 202. For discussion purposes, the example timing diagram 210 will be discussed with respect to the low-power router 156 transmitting data to the low-power router 152 of the communication network 150. However, it should be noted that the transmission and reception of a wake-up packet depicted in FIG. 10 may be performed by any type of device in the smart home environment 30.

Referring now to FIG. 10, the low-power router 156 may transmit a wake-up packet 212 to the low-power router 152 during the wake-up slot 202 of the communication schedule 200. In one embodiment, the wake-up packet 212 may be transmitted by the low-power router 156 during a receiver sniff interval 214 ($\Delta t_{sniff}$). The receiver sniff interval 214 may correspond to a period of time in which the low-power router 152 may activate its receiver, such that the low-power router 152 may detect whether a start of frame of the wake-up packet 212, which may include any clock drift that may have occurred since a previous time synchronization signal was received, is being transmitted. If time synchronization events are occurring often enough to maintain a clock drift of less than +/−1 ms, then the duration of the receiver sniff interval 214 may be at least, for example, 2 ms.

With the receiver sniff interval 214 in mind, the low-power router 152 may transmit the wake-up packet 212, such that the transmission of the wake-up packet 212 is centered on time $T_2$ or the middle of the receiver sniff interval 214. By centering the transmission of the wake-up packet 212 on the middle of the receiver sniff interval 214, the low-power router 156 may enable the low-power router 156 to receive the wake-up packet 212 even if the clock of the low-power router 156 has drifted with respect to the clock of the low-power router 152, or vice-versa. In certain embodiments, the receiver sniff interval 214 occurs after a known offset of time has passed from the start of the wake-up time slot 202. As such, when centering the transmission of the wake-up packet 212 on time $T_2$, the low-power router 152 may use the known offset time to determine when to transmit the wake-up packet 212. Further, the known offset of time may also be used to communicate a time between the low-power router 152 and other components in the smart home environment 30.

In one embodiment, the wake-up packet 212 may include time synchronization information, such that the clock of the low-power router 152 and the clock of the low-power router 156 may be in sync with each other. In addition to the time synchronization information, the wake-up packet 212 may include additional information such as a size of data that may be transmitted to the low-power router 152 from the low-power router 156 or the like.

After receiving the wake-up packet 212, the low-power router 156 may transmit an acknowledgement packet 216 to the low-power router 152. As such, after transmitting the wake-up packet 212, the low-power router 152 may activate its receiver to receive the acknowledgement packet 216. In one embodiment, the acknowledgement packet 216 may also include time synchronization information from the perspective of the low-power router 156. That is, the acknowledgement packet 216 may include a time stamp from a clock of the low-power router 156 that may be used to synchronize with a clock of the low-power router 152.

After sending and receiving the wake-up packet 212, the low-power router 156 and the low-power router 152 may negotiate or determine how they may communicate to send and receive subsequent data packets. For example, the low-power router 156 and the low-power router 152 may determine whether to send data packets immediately following the transmission and reception of the acknowledgement packet 216 or based on the scheduled communication times, as per the communication schedule 200.

Figure 11:
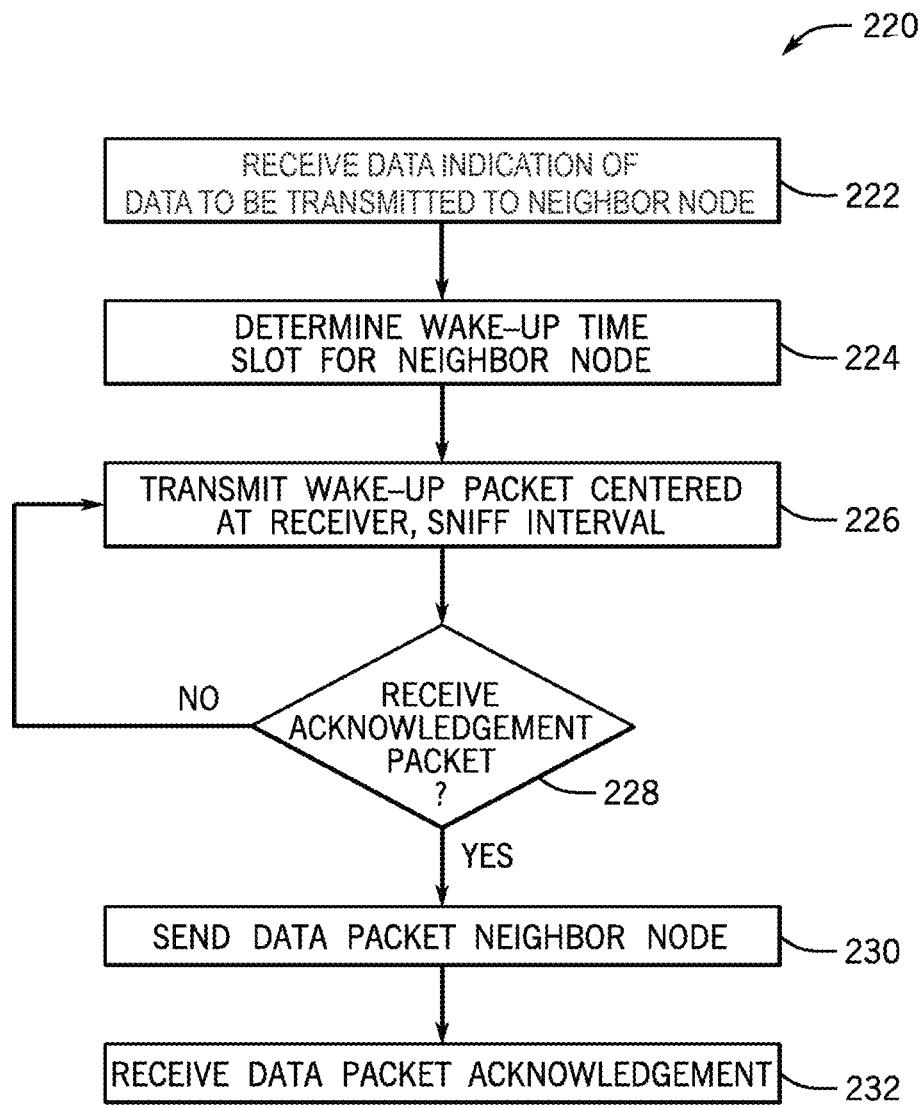
FIG. 11 illustrates a flow chart of a method for transmitting data to another electronic device within the smart-home environment of FIG. 2, in accordance with an embodiment.

Keeping the foregoing in mind, FIG. 11 illustrates a flowchart of a method 220 that the low-power router 156 (i.e., transmitting device) may employ when transmitting data to the low-power router 152 (i.e., receiving device) using a single wake-up packet. Although the method 220 is described as being performed by a processor associated with the low-power router 156, it should be noted that the method 220 may be performed by any type of device 10 that may be part of the smart home environment 30.

Referring now to FIG. 11, at block 222, a processor of the low-power router 156 may receive an indication of data that is to be transmitted to a neighboring node or device (e.g., low-power router 152). The data may correspond to any type of data that the processor may be programmed to share or communicate with a neighboring node. In certain embodiments, the data may correspond to an alarm related to a hazardous event (e.g., carbon monoxide, fire). The data may also correspond to non-alarm events such as sensor reading or requested commands. For example, the sensor readings may correspond to measurements acquired by sensors associated with the low-power router 156. The measurements may include temperature measurements, occupancy information, and the like. The commands may correspond to commands to operate another device 10 in the smart home environment. For instance, a command may request that a front door be unlocked. The data may also include information identifying the low-power router 156 as a new node in the communication network 150, thereby joining the communication network 150.

At block 224, the processor may determine a wake-up time slot in the communication schedule 200 associated with the low-power router 152. After identifying the wake-up time slot, the processor may, at block 226, transmit the wake-up packet 212 to the low-power router 152. In one embodiment, the processor may schedule the transmission of the wake-up packet 212 centered at the receiver sniff interval 214.

At block 228, the processor may determine whether an acknowledgment packet associated with the transmitted wake-up packet 212 was received from the low-power router 152. If the acknowledgment packet was not received, the processor may return to block 226 and retransmit the wake-up packet 212 during the wake-up slot 202 in a subsequent frame of time slots and channels in the communication schedule 200.

If the processor receives the acknowledgment packet, the processor may proceed to block 230. At block 230, the processor may send one or more data packets associated with the data received at block 222 to the low-power router 152. In certain embodiments, the processor may negotiate or arbitrate with the low-power router 152 when to send the one or more data packets to the low-power router 152. For example, the processor may determine to send the data packets to the low-power router 152 during one or more time slots and one or more corresponding communication channels designated for bilateral communication between the low-power router 152 and the low-power router 156, as specified by the communication schedule 200. In another example, the wake-up packet 212 may specify which time slots of the communication schedule 200 that the data packet may be sent at block 230. In yet another example, the processor may indicate to the low-power router 156 that the data packets will be sent immediately after the acknowledgement packet 216 was received.

In addition to sending the data packets associated with the data received at block 222 to the low-power router 152, the processor may use time synchronization information stored in the acknowledgement packet to sync the clock of the of the low-power router 156 with the clock of the low-power router 152. That is, the time synchronization information may include a time stamp of the acknowledgement packet or a known offset from the start of a wake slot, both of which may be used to sync the clock of the of the low-power router 156 with the clock of the low-power router 152.

After sending the data packet(s), at block 232, the processor of the low-power router 156 may receive a data packet acknowledgment from the low-power router 152. The data packet acknowledgment indicates that the low-power router 152 has properly received (e.g., error-free) the data packet transmitted by the low-power router 156.

Figure 12:
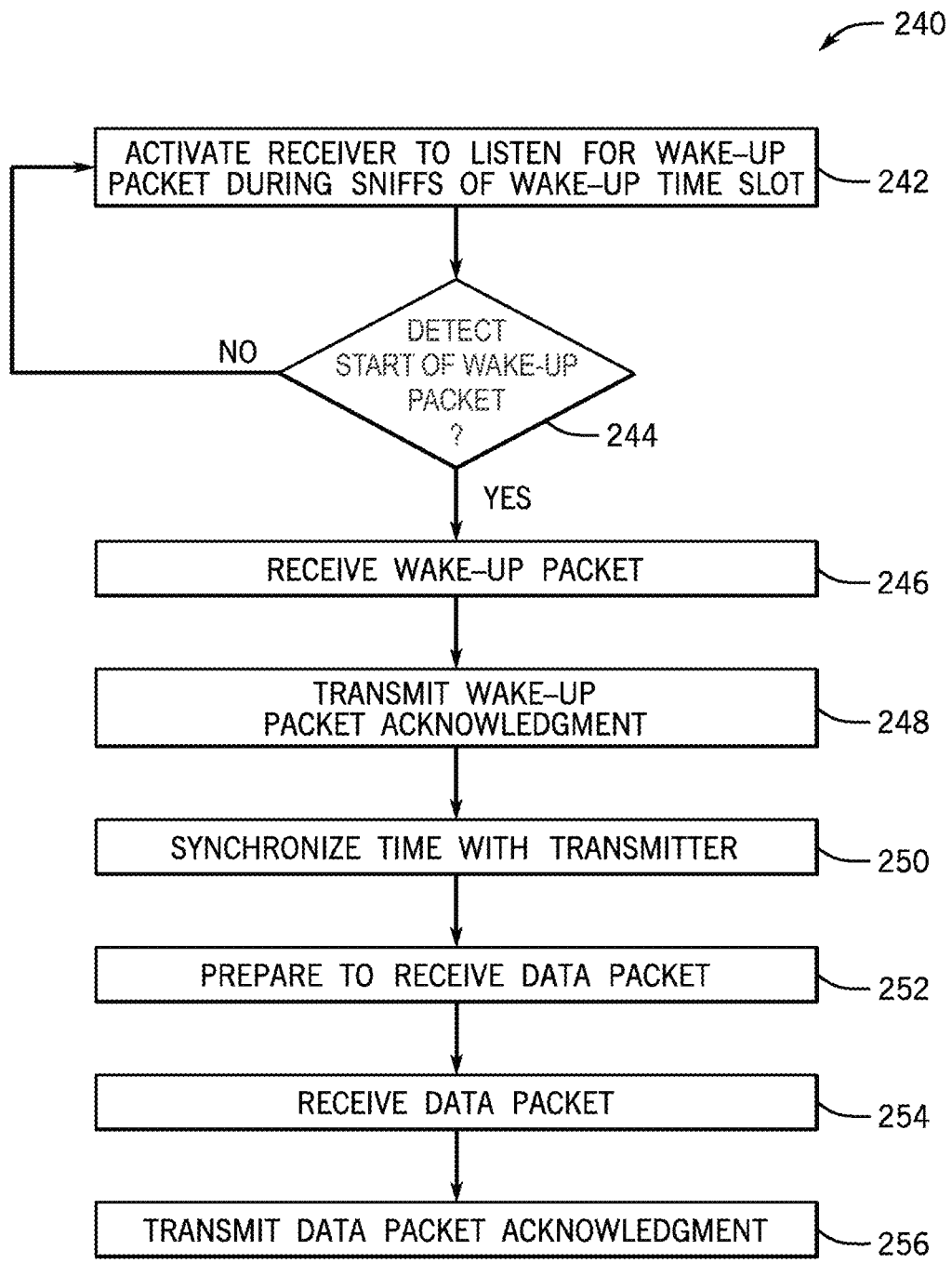
FIG. 12 illustrates a flow chart of a method for receiving data from an electronic device within the smart-home environment of FIG. 2, in accordance with an embodiment.

With the method 220 in mind, FIG. 12 illustrates a flowchart of a method 240 that a processor of the low-power router 152 (i.e., receiving device) may perform when being awaken to receive data from the low-power router 156 (i.e., transmitting device). As mentioned above with regard to the method 220, although the method 240 is described as being performed by a processor associated with the low-power router 152, it should be noted that the method 240 may be performed by any type of device 10 that may be part of the smart home environment 30.

Referring now to FIG. 12, at block 242, the processor of the low-power router 152 may activate a receiver component of the network interface 18 to listen for the transmission of wake-up packets. In one embodiment, the processor may activate the receiver of the low-power router 152 for a period of time (e.g., ~2 ms) during the receiver sniff interval 214.

At block 244, the processor may detect whether the start of the wake-up packet 212 is being transmitted to the low-power router 152. If the processor detects that the start of the wake-up packet 212 is being transmitted during receiver sniff interval 214, the processor may proceed to block 246 and begin to receive the wake-up packet 212. If the processor does not detect that the start of the wake-up packet 212 is being transmitted during the receiver sniff interval 24, the processor may return to block 242 and activate its receiver during the wake-up slot of a subsequent frame of time slots and communication channels.

After receiving the wake-up packet 212, at block 248, the processor may transmit an acknowledgment packet 216 indicating that the wake-up packet 212 has been received by the low-power router 152. As mentioned above, the acknowledgment packet 216 may include time synchronization information that may be used to sync the clocks of the low-power router 156 and the low-power router 152. In certain embodiments, before sending the acknowledgment, the processor of the low-power router 152 may determine whether the received wake-up packet 212 is error-free.

At block 250, the processor of the low-power router 152 may analyze the wake-up packet 212 and synchronize the clock of the low-power router 152 with time information that may be provided by the wake-up packet 212. The time information of the wake-up packet 212 may correspond to a time of the clock of the low-power router 156. In this manner, the low-power router 152 (i.e., receiving device) and the low-power router 156 (i.e., transmitting device) may be in sync with each other. As a result, the low-power router 156 may precisely send the wake-up packet 212 in any future transmission, such that the wake-up packet 212 is centered at the receiver sniff interval 214.

At block to 252, the processor of the low-power router 152 may prepare to receive a data packet being transmitted by the low-power router 156. In certain embodiments, the processor may identify one or more time slots and one or more corresponding communication channels in which the low-power router 152 may receive the data packet based on the communication schedule 200. Alternatively, as mentioned above, the processor may prepare to receive the data packet based on negotiated or arbitrated time slots as specified by the low-power router 156.

After determining the appropriate time slot(s) and corresponding communication channel(s), at block 254, the processor may begin receiving the data packet(s) at the respective time slot(s) and the respective communication channel(s). After receiving the data packet(s) from the low-power router 156, the processor of the low-power router 152 may determine whether the received data packet(s) were properly received. In one embodiment, the processor may verify that the data packet(s) were received free of errors. After verifying that the data packet(s) were properly received, the processor may send an acknowledgment related to the reception of each data packet to the low-power router 156.

Although the techniques described above for sending a single wake-up packet centered at the receiver sniff interval 214 is useful in efficiently waking neighboring nodes, if the transmitting device and the receiving device have clocks that are out of sync with each other, the single wake-up packet may not be received by the low-power router 152. As such, in some embodiments, the low-power router 152 may send a short chain of wake-up packets 212 or more than one wake-up packet 212 centered at the receiver interval sniff 214.

Figure 13:
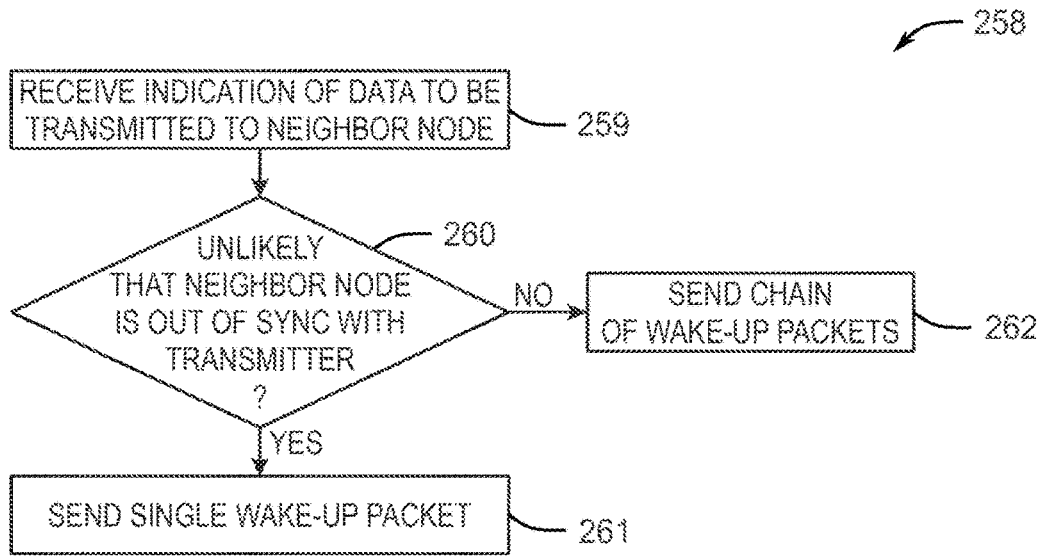
FIG. 13 illustrates a flow chart of a method for determining whether to send a short chain of wake-up packets to another electronic device within the smart-home environment of FIG. 2, in accordance with an embodiment.

With the foregoing in mind, FIG. 13 illustrates a flow chart of a method 258 for sending a chain of wake-up packets 212. As mentioned above with regard to the methods 220 and 240, although the method 258 is described as being performed by a processor associated with the low-power router 156, it should be noted that the method 258 may be performed by any type of device 10 that may be part of the smart home environment 30.

Referring now to FIG. 13, at block 259, the processor of the low-power router 156 may receive an indication of data to be transmitted to the low-power router 152 (e.g., neighbor node), as described above with regard to block 222. At block 260, the processor may determine whether it is unlikely that the low-power router 152 is out of sync with the low-power router 156. That is, the processor may determine the likelihood that the clocks of the low-power router 152 and the low-power router 156 have drifted with respect to each other.

In one embodiment, the likelihood that the clocks of the low-power router 152 and the low-power router 156 have drifted with respect to each other may be determined by tracking the amount of time since last communication occurred between each other or between the respective device and a neighbor node. That is, the time drift may be a function of time since last sync. Additionally, an estimated drift rate of the neighbor node may be tracked based on a weighted average of a sync error (ppm) at each sync event. As such, the estimated drift may be the product of an amount of time since a last sync with a neighbor node (time_since_last_heard) and the sync error (sync_error). Further, the sender can forward correctly based on the estimated drift and center the wake packet on the expected time the neighbor will be sniffing. This allows the wake chain duration to be decreased, thereby providing additional power savings.

If, at block 260, the processor determines that the low-power router 156 is unlikely to be out of sync with the low-power router 152, the processor may proceed to block 261 and send a single wake-up packet 212, as described above with regard to FIG. 11. However, if the processor determines that the low-power router 156 is likely to be out of sync with the low-power router 152, the processor may proceed to block 262 and send a chain of wake-up packets 212. In one embodiment, the minimum length of the wake up chain may be calculated by estimating a maximum drift that has occurred.

Figure 14:
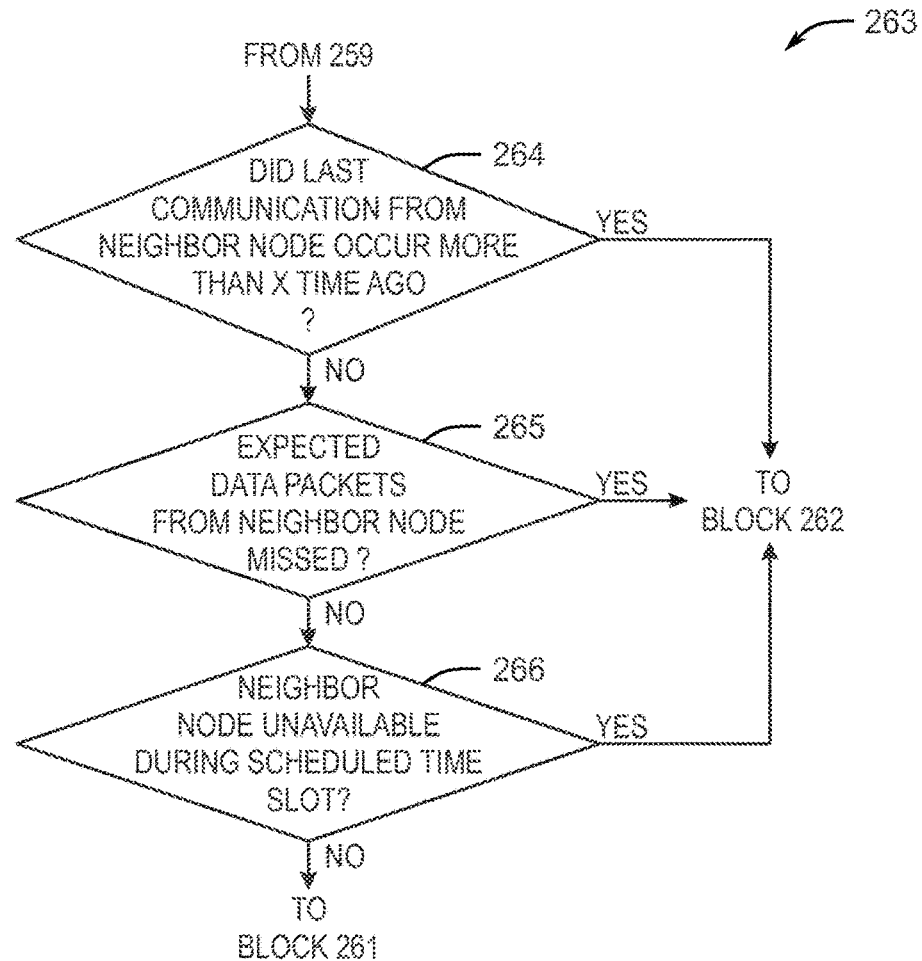
FIG. 14 illustrates a flow chart of a method for determining a likelihood of electronic devices in the smart-home environment of FIG. 2 are synchronized with each other, in accordance with an embodiment.

Referring back to block 260, to determine whether it is unlikely that the low-power router 152 and the low-power router 156 are out of synch with each other, the processor may perform the method 263 illustrated in FIG. 14. As shown in the method 263, at block 264, the processor of the low-power router 156 may determine whether the last communication with the low-power router 152 occurred after some period of time has passed (e.g., 6 hours). Generally, a pair of communicating devices may allow their clocks to be synchronized with each other if they are able to maintain regular communication with each other. That is, if the two devices regularly communicate with each other, they may exchange time synchronization information to ensure that the respective clock of each device is in sync with each other.

Figure 16:
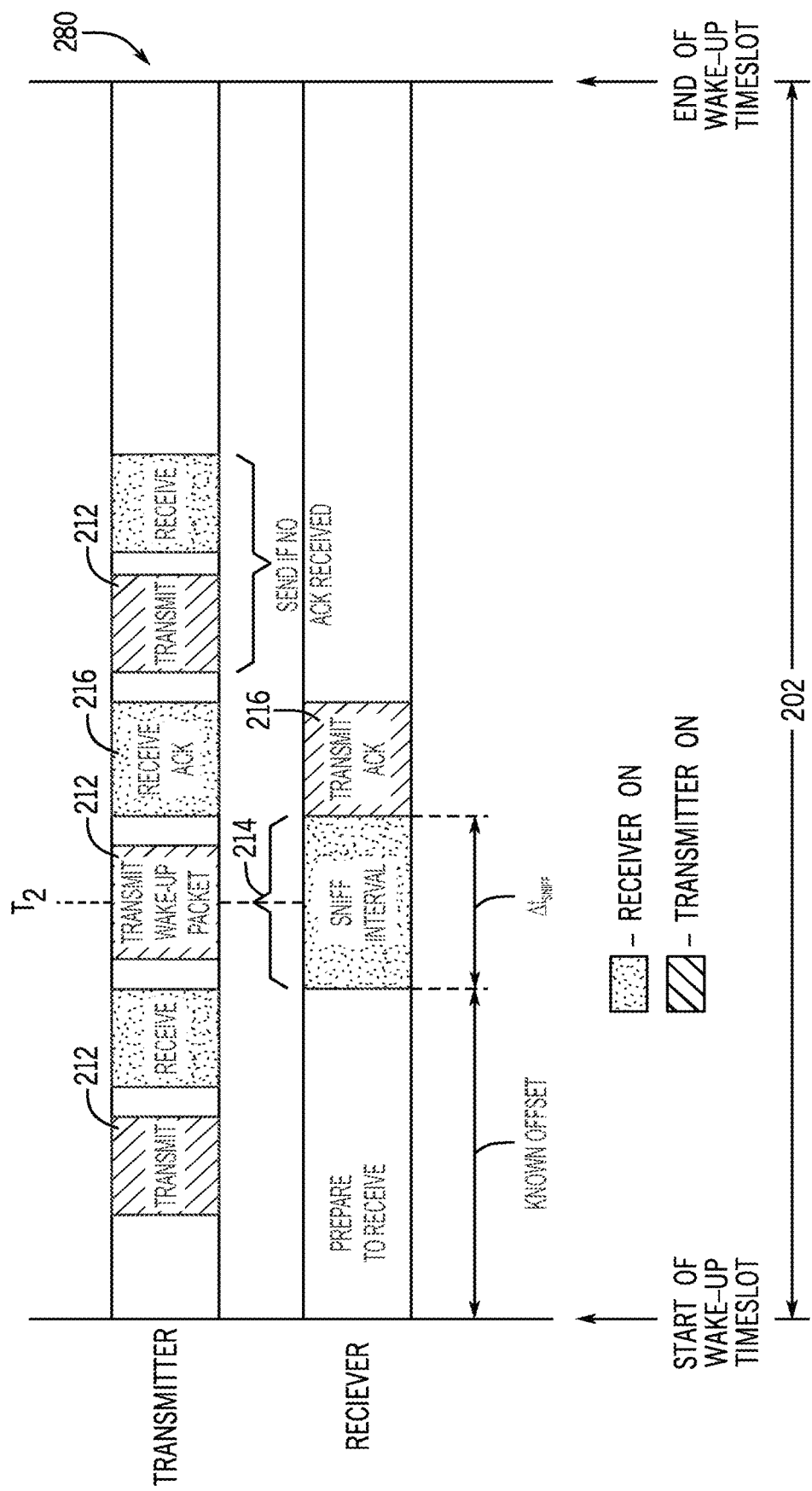
FIG. 16 illustrates an example timing diagram indicating how an electronic device may be awaken by another electronic device during the wake-up time slot FIG. 9 using the short chain of wake-up packets, in accordance with an embodiment.

If the last communication with the low-power router 152 occurred after the amount of time has passed, the processor may proceed to block 262 and send a chain of wake-up packets 212. In one embodiment, the chain of wake-up packets 212 may include three wake-up packets 212 as shown in FIG. 16. The transmission of the wake-up packets 212 may involve sending the wake-up packet 212 and waiting a certain amount of time to receive an acknowledgment for the reception of the wake-up packet 212. In one embodiment, the chain of wake-up packets 212 are transmitted during the receiver sniff interval 214. As such, the receiver sniff interval 214 may include a sufficient amount of time to receive at least one wake-up packet 212 of the chain of wake-up packets 212 even when the clock of the low-power router 152 shifts ahead or behind the clock of the low-power router 156. For example, the time between the start of two adjacent wake-up packets 212 of the chain of wake-up packets 212 may be less than the duration of the receiver sniff interval 214, thereby better ensuring that the start of a wake-up packet 212 will be detected during the receiver sniff interval 214. In other words, if the start of a first wake-up packet 212 drifts to the left (e.g., earlier), outside of the sniff interval 214, the start of subsequent wake-up packet 212 should be within the sniff interval 214 and account for the size of the first wake-up packet 212 and any interframe spacing.

By sending the chain of wake-up packets 212 centered at the receiver sniff interval 214, the processor may increase the likelihood that the low-power router 152 may receive the wake-up packet 212 when the respective clocks of the low-power router 156 and the low-power router 156 are not in sync with each other or has drifted more than $\Delta t_{sniff}$. In one embodiment, the processor may continuously send a wake-up packet 212 and wait an amount of time to receive the acknowledgment packet 216 until the acknowledgment packet 216 has been received. As such, the processor may stop sending the wake-up packets 212 after the acknowledgment packet 216 has been received.

Referring back to block 264 of FIG. 14, if the last communication from the low-power router 152 occurred before the amount of time passed, the processor may proceed to block 262. At block 262, the processor may send a single wake-up packet 212 as described above with respect to FIGS. 10-12.

If the last communication from the low-power router 152 (e.g., neighbor node) did not occur before the expected amount of time passed, the processor may proceed to block 265. At block 265, the processor may determine whether data expected to be received from the low-power router 152 or a check-in message from the low-power router 152 was missed. If the processor expects to receive data from the low-power router 152 and did not receive the expected data from the low-power router 152, the processor may proceed to block 266. If the processor expects to receive data from the low-power router 152 and did receive the expected data from the low-power router 152, the processor may proceed to block 262 and send a single wake-up packet 212 as described above.

At block 266, the processor may determine whether the low-power router 152 is available for communication for a scheduled time slot. If the low-power router 152 is not available during the scheduled time slot, the processor may proceed to block 262 and send the chain of wake-up packets 212 as described above. Otherwise, if the low-power router 152 is available during its scheduled time slots, the processor may proceed to block 261 and send a single wake-up packet 212.

It should be noted that blocks 264-266 provide examples in which the likelihood of clocks of the low-power router 152 and the low-power router 156 being out of sync is determined. It should be understood that the blocks 264-266 are merely examples and additional techniques and algorithms may be employed to determine that the likelihood of clocks of the low-power router 152 and the low-power router 156 are out of sync. Moreover, although the method 263 has been illustrated in a certain order, it should be understood that the blocks depicted in FIG. 14 may be performed in any suitable order.

Figure 15:
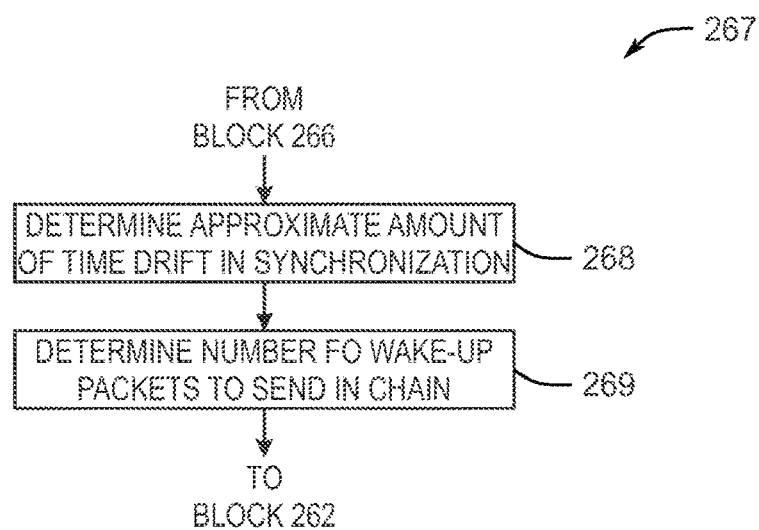
FIG. 15 illustrates a flow chart of a method for adjusting a number of wake-up packets sent in a chain of wake-up packets as described in the flow chart of FIG. 13, in accordance with an embodiment.

When transmitting the chain of wake-up packets 212, the processor may use an expected amount of drift time between the clocks of the low-power router 152 and the low-power router 156 to determine a number of wake-up packets 212 in the chain of wake-up packets 212. For example, FIG. 15 illustrates a method 267 for determining a number of wake-up packets 212 to transmit in the chain of wake-up packets 212 described above.

In one embodiment, at block 268, the processor may determine an approximate amount of time drift in synchronization between the clocks of the low-power router 152 and the low-power router 156. The approximate amount of time drift may be determined based on an amount of time from a last known communication, the estimated drift rate of between two nodes, time information provided by another node, or the like.

After determining the approximate amount of time drift that may be present between the clocks of the low-power router 152 and the low-power router 156, the processor may proceed to block 269. At block 269, the processor may determine a number of wake-up packets 212 to transmit in the chain of wake-up packets 212. In one embodiment, the number of wake-up packets 212 may be directly proportional to the approximate amount of time drift that may be present between the clocks of the low-power router 152 and the low-power router 156.

In certain embodiments, the low-power router 152 may activate its receiver for a shorter amount of time as compared to the receiver sniff interval 214 described above. That is, the low-power router 152 may activate its receiver for a first amount of time (e.g., 0.2 ms), deactivate its receiver for a second amount of time (e.g., (1.6 ms), and activate its receiver again for a third amount of time (e.g., 0.2 ms). In other words, the low-power router 152 may perform a double sniff during the receiver sniff interval 214. With this in mind, FIG. 17 illustrates a timing diagram 280 that illustrates how the low-power router 156 may activate its receiver according to a double sniff scheme.

Figure 17:
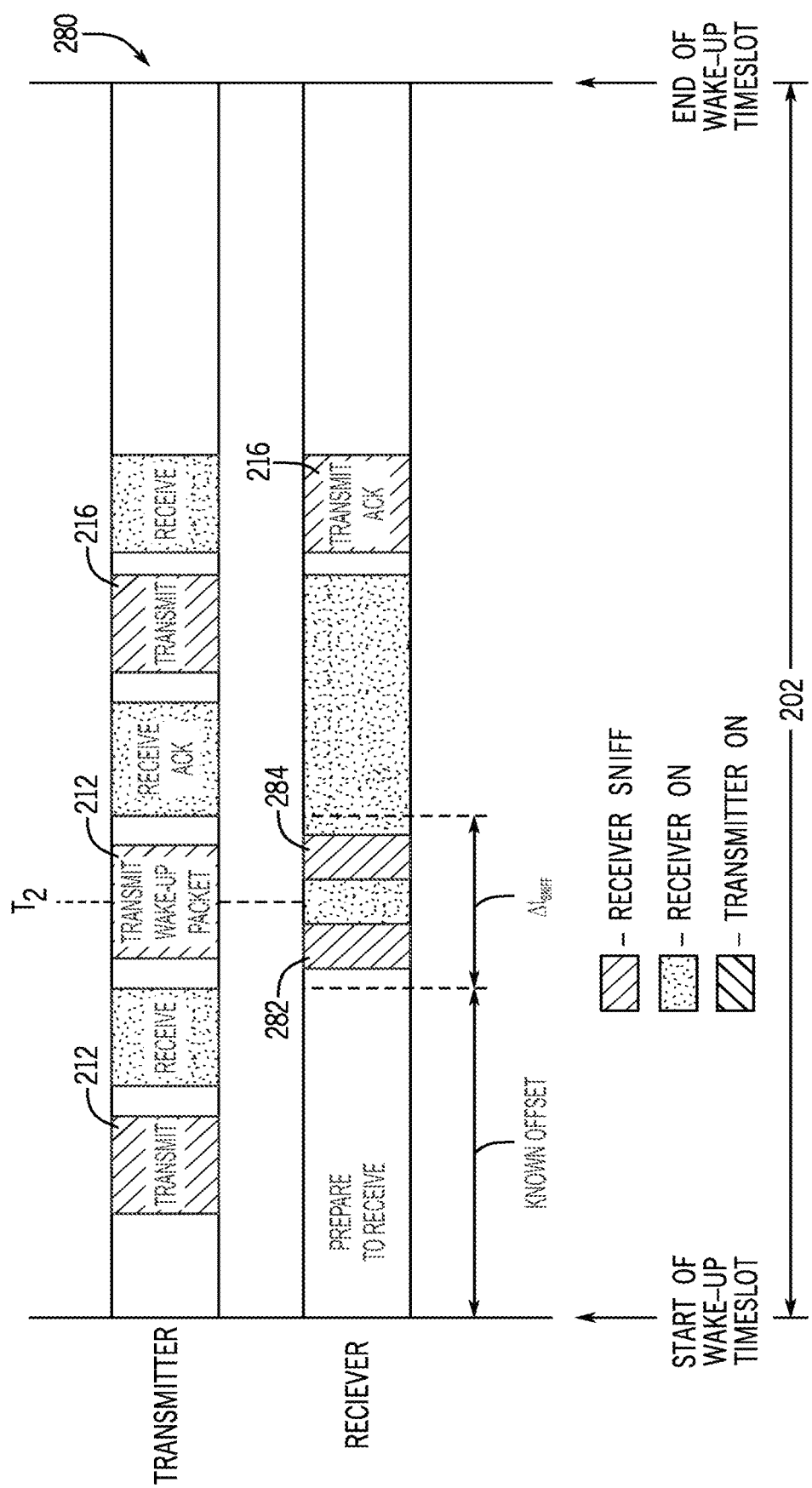
FIG. 17 illustrates an example timing diagram indicating how an electronic device may be awaken by another electronic device during a double sniff receiver interval in the wake-up time slot FIG. 9, in accordance with an embodiment.

Referring to FIG. 17, the low-power router 156 may transmit a chain of wake-up packets 212, such that it may be centered at the receiver sniff interval 214 (e.g., time $T_2$). By sending the wake-up packet 212 centered at time $T_2$ and using the double receiver sniff process described above, the low-power router 152 may detect the radio frequency energy of the wake-up packet 212 when the clocks of the low-power router 152 and the low-power router 156 have drifted apart from each other. For example, if the clock of the low-power router 156 has drifted ahead of the clock of the low-power router 152, the low-power router 156 may send the wake-up packet 212 too early when attempting to send the wake-up packet 212 centered at time $T_2$. In this case, the low-power router 152 may detect the wake-up packet 212 during its first sniff 282 of the double sniff, which may correspond to the end of the wake-up packet 212. In the same manner, if the clock of the low-power router 156 has drifted behind of the clock of the low-power router 152, the low-power router 156 may send the wake-up packet 212 too late when attempting to send the wake-up packet 212 centered at time $T_2$. However, the low-power router 152 may detect the wake-up packet 212 during its second sniff 284 of the double sniff, which may correspond to the beginning of the wake-up packet 212.

After detecting the transmission of the wake-up packet 212, the low-power router 152 may keep its receiver active to receive a subsequent wake-up packet 212 transmitted from the low-power router 156. After transmitting the wake-up packet 212, the low-power router 156 may begin preparing to receive an acknowledgment packet 216 from the low-power router 152. The acknowledgment packet 216 may include data indicating that the wake-up packet 212 was received properly (e.g., without errors) by the low-power router 152. As such, after low-power router 156 receives the wake-up packet 212, the low-power router 152 may process the wake-up packet 212 and prepare to transmit the acknowledgment packet 216 to the low-power router 156.

Figure 18:
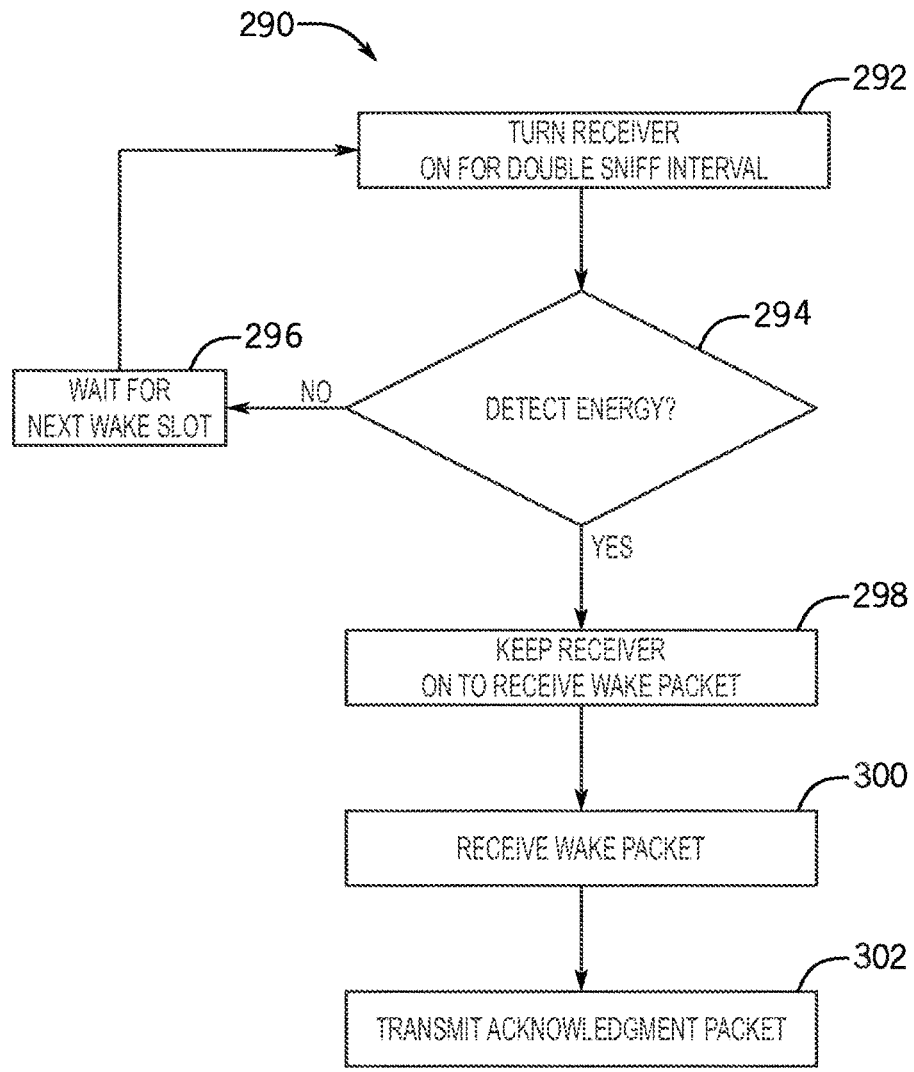
FIG. 18 illustrates a flow chart of a method for detecting a transmission of a wake-up packet using a double sniff receiver interval and receiving the wake-up packet after detecting the transmission from another electronic device within the smart-home environment of FIG. 2, in accordance with an embodiment.

With the foregoing in mind, FIG. 18 illustrates a flow chart of a method 290 that a processor of a receiving device may use for employing a double sniff scheme for receiving the wake-up packet 212. For the purposes of discussion, the following description will be presented as being performed by the processor of the low-power router 152 (i.e., receiving device).

At block 292, the processor may activate its receiver using the double sniff technique discussed above during the sniff interval 214. Although the following description of the method 290 is discussed using a double sniff technique, it should be noted that the processor may activate its receiver using a triple sniff technique, quadruple sniff technique, of any other suitable sniff variation. Regardless of the number of sniffs employed by the processor, at block 294, the processor may determine whether any energy (e.g., radio frequency energy) has been detected during the sniff interval 214.

If the processor does not detect radio frequency energy, the processor may proceed to block 296 and wait to activate its receiver again at the next wake slot according to the communication schedule 200. If the processor does detect radio frequency energy during one of its sniffs, the processor may proceed to block 298. At block 298, the processor may keep its receiver active to receive the wake-up packet 212. That is, since the wake-up packet 212 was likely the detected energy of block 294, the processor may keep its receiver on to receive the next transmitted wake-up packet 212 in the chain of wake-up packets, as illustrated in FIG. 15.

At block 300, the processor may receive the wake-up packet while its receiver is on after detecting the energy at block 294. After receiving the wake-up packet 212, at block 302, the processor may transmit the acknowledgment packet 216 to the low-power router 152 (e.g., transmitting device).

By employing the double receiver sniff process described above, the low-power router 152 (i.e., receiving device) may use power more efficiently as compared to activating its receiver during the entire sniff interval 214. Additionally, by transmitting the wake-up packet 212 during the fixed wake-up slot 202, the low-power router 156 (i.e., transmitting device) does not blast or continuously transmit a wake-up packet across one or more communication channels for an extended amount of time when attempting to send data to neighboring devices. That is, instead of blasting wake-up packets for an extended period of time, the transmitting device may send a repeated sequence of wake-up packets, but since there is a common time reference, it can send a much shorter sequence of such wake-up packets. For example, a 20 ms blast of a chain of wake-up packets can be sent, as opposed to a 4000 ms blast.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system configured to communicate according to a communication schedule comprising a plurality of frames, each frame of the plurality of frames being organized according to a grid of cells, each of the cells being associated with one of a plurality of communication channels and one of a plurality of time slots, the system comprising:
a first electronic device configured to activate a receiver according to the communication schedule to receive a wake-up packet that indicates there are data packets to receive from a second electronic device by:
activating the receiver relative to a time slot on a communication channel for a first duration of time;
deactivating the receiver for a second duration of time after the first duration of time expires to reduce power consumption by the first electronic device; and
reactivating the receiver relative to the time slot on the communication channel for a third duration of time after the second duration of time expires, the timing of the activation and the reactivation being disposed about the time slot on the communication channel to account for clock drift of the first electronic device, the second electronic device, or both; and the second electronic device configured to communicate with the first electronic device by:
transmitting the wake-up packet during the time slot on the communication channel, the time slot and the communication channel being associated with a cell in the communication schedule at a known position in each frame of the plurality of frames of the communication schedule, and the first electronic device being configured to perform an operation based on receiving the wake-up packet.

2. The system of claim 1, wherein the second electronic device is configured to communicate with the first electronic device by transmitting one or more data packets to the first electronic device when the first electronic device is configured to activate the receiver based on the communication schedule.

3. The system of claim 1, wherein the grid of cells indicates at least one time slot and a corresponding communication channel in which a pair of electronic devices are scheduled to communication with each other.

4. The system of claim 1, wherein the second electronic device is configured to:
in response to the first electronic device receiving the wake-up packet, receiving, from the first electronic device, an acknowledgment packet associated with the wake-up packet.

5. The system of claim 1, wherein each frame of the plurality of frames of the communication schedule comprises at least one cell that is associated with a pair of devices in a respective grid.

6. The system of claim 5, wherein the at least one cell is in a fixed position in the respective grid of each frame of the plurality of frames.

7. The system of claim 1, wherein the first electronic device and the second electronic device are configured to operate in a low-power mode by operating in a sleep mode for a first period of time and awaking periodically to detect data transmissions.

8. The system of claim 1, wherein the first electronic device is configured to:
receive the wake-up packet after detecting that the wake-up packet is being transmitted during the time slot on the communication channel;
synchronize a clock associated with the first electronic device based on the wake-up packet;
verify that the wake-up packet is received free of any error; and
based upon verification of the wake-up packet, send an acknowledgment packet to the second electronic device.

9. An electronic device configured to communicate with a plurality of electronic devices disposed in a building according to a communication schedule comprising a plurality of frames, each frame of the plurality of frames being organized according to a grid of cells, each of the cells being associated with one of a plurality of communication channels and one of a plurality of time slots, the electronic device comprising a processor configured to:
identify a cell in a frame of the grid of the communication schedule in which the electronic device and another electronic device are scheduled to communicate with each other, the cell being associated with a time slot and a communication channel for the communication; and
transmit a plurality of wake-up packets centered at a time within the time slot to the other electronic device, each of the plurality of wake-up packets being configured to cause the other electronic device to perform an operation based on receiving one of the wake-up packets.

10. The electronic device of claim 9, wherein the processor is configured to:
    receive an indication of data to be transmitted to the other electronic device of the plurality of electronic devices; and
    transmit one or more data packets associated with the data after receiving an acknowledgment associated with one of the plurality of wake-up packets.

11. The electronic device of claim 10, wherein the data comprises alarm information, one or more sensor measurements, one or more commands, or any combination thereof.

12. The electronic device of claim 9, wherein a number of the plurality of wake-up packets is determined based on an expected amount of time drift between the electronic device and the other electronic device.

13. The electronic device of claim 9, wherein the operation comprises instructions configured to control one or more operations of one or more devices in the building.

14. The electronic device of claim 9, wherein the processor is configured to transmit the plurality of wake-up packets during the time slot, such that the transmission of the plurality of wake-up packets is centered about a double sniff interval of the other electronic device.

15. The electronic device of claim 9, wherein the one of the plurality of wake-up packets comprises time synchronization information associated with a clock of the electronic device.

16. The electronic device of claim 9, wherein the processor is configured to transmit the plurality of wake-up packets when communication between the electronic device and the other electronic device has not occurred for a period of time, when the processor determines that an expected data packet from the other electronic device has not been received, when the processor determines that the other electronic device is not available during a scheduled time according to the communication schedule, or any combination thereof.

17. An electronic device configured to communicate according to a communication schedule comprising a plurality of frames, each frame of the plurality of frames being organized according to a grid of cells, each of the cells being associated with one of a plurality of communication channels and one of a plurality of time slots, the electronic device comprising:
    a wireless receiver; and
    a processor coupled to the wireless receiver, the processor configured to:
        activate the wireless receiver according to the communication schedule and using a double sniff interval, the wireless receiver being configured to receive data packets from another communication device, and the wireless receiver being activated during one of the plurality of time slots and on one of the plurality of communication channels, the double sniff interval being disposed about the one of the plurality of time slots and on the one of the plurality of communication channels;
        detect energy of a wake-up packet when the wireless receiver is activated; and
        activate the wireless receiver for a duration of time when the energy is detected, the duration of time corresponding to an amount of time to receive the wake-up packet.

18. The electronic device of claim 17, wherein the processor is configured to:
    determine time information associated with the other communication device that is included in the wake-up packet; and
    adjust a clock of the electronic device based on the time information.

19. The electronic device of claim 17, wherein the electronic device comprises a thermostat, a hazard detector, or a portable electronic device, and wherein the wake-up packet comprises instructions to perform an operation configured to adjust a condition in a building.

20. The electronic device of claim 17, wherein when using the double sniff interval, the processor is configured to:
    activate the wireless receiver relative to the one of the plurality of time slots on the one of the plurality of communication channels for a first duration of time;
    deactivate the wireless receiver for a second duration of time after the first duration of time expires to reduce power consumption by the electronic device; and
    reactivate the wireless receiver relative to the time slot on the communication channel for a third duration of time after the second duration of time expires.

* * * * *